US012562287B2

(12) United States Patent
Cisneros, Jr. et al.

(10) Patent No.: US 12,562,287 B2
(45) Date of Patent: Feb. 24, 2026

(54) MOLTEN FUEL REACTOR THERMAL MANAGEMENT CONFIGURATIONS

(71) Applicant: TerraPower, LLc, Bellevue, WA (US)

(72) Inventors: Anselmo T. Cisneros, Jr., Seattle, WA (US); Christopher J. Johns, Tacoma, WA (US); Brian C. Kelleher, Seattle, WA (US); Kevin Kramer, Redmond, WA (US); Jeffery F. Latkowski, Mercer Island, WA (US); Jon D. McWhirter, Kirkland, WA (US)

(73) Assignee: TerraPower, LLC, Bellevue, WA (US)

(*) Notice: Subject to any disclaimer, the term of this patent is extended or adjusted under 35 U.S.C. 154(b) by 582 days.

(21) Appl. No.: 17/743,169

(22) Filed: May 12, 2022

(65) Prior Publication Data

US 2022/0301729 A1    Sep. 22, 2022

Related U.S. Application Data

(62) Division of application No. 16/824,125, filed on Mar. 19, 2020, now Pat. No. 11,367,536, which is a
(Continued)

(51) Int. Cl.
G21C 1/03          (2006.01)
G21C 1/22          (2006.01)
(Continued)

(52) U.S. Cl.
CPC .............. G21C 1/326 (2013.01); G21C 1/03 (2013.01); G21C 1/22 (2013.01); G21C 15/02 (2013.01);
(Continued)

(58) Field of Classification Search
None
See application file for complete search history.

(56) References Cited

U.S. PATENT DOCUMENTS 2,375,009 A    5/1945  Lepsoe et al.
2,874,106 A    2/1959  Hammond et al.
(Continued)

FOREIGN PATENT DOCUMENTS

CA          631890 A      11/1961
CA          3011398 A1     1/2020
(Continued)

OTHER PUBLICATIONS

Gandini, A., et al. "Hot spot identification by sensitivity analysis and probabilistic inference methods: Demonstration exercise." Annals of Nuclear Energy 50 (2012): 175-184. (Year: 2012).*
(Continued)

*Primary Examiner* — Lily C Garner
(74) *Attorney, Agent, or Firm* — Merchant and Gould, PC

(57)          ABSTRACT

Configurations of molten fuel salt reactors are described that allow for active cooling of the containment vessel of the reactor by the primary coolant. Furthermore, naturally circulating reactor configurations are described in which the reactor cores are substantially frustum-shaped so that the thermal center of the reactor core is below the outlet of the primary heat exchangers. Heat exchanger configurations are described in which welded components are distanced from the reactor core to reduce the damage caused by neutron flux from the reactor. Radial loop reactor configurations are also described.

9 Claims, 13 Drawing Sheets
(1 of 13 Drawing Sheet(s) Filed in Color)

Related U.S. Application Data division of application No. 15/584,659, filed on May 2, 2017, now abandoned.

(51) Int. Cl.

| | |
|---|---|
| *G21C 1/32* | (2006.01) |
| *G21C 15/02* | (2006.01) |
| *G21C 15/243* | (2006.01) |
| G21C 1/14 | (2006.01) |
| G21C 3/54 | (2006.01) |
| G21C 11/06 | (2006.01) |
| G21C 15/26 | (2006.01) |
| G21C 15/28 | (2006.01) |

(52) U.S. Cl.

CPC ............. *G21C 15/243* (2013.01); *G21C 1/14* (2013.01); *G21C 3/54* (2013.01); *G21C 11/06* (2013.01); *G21C 15/26* (2013.01); *G21C 15/28* (2013.01); *Y02E 30/30* (2013.01)

(56) References Cited

U.S. PATENT DOCUMENTS

| | | | |
|---|---|---|---|
| 2,920,024 A | 1/1960 | Barton et al. | |
| 2,945,794 A | 7/1960 | Winters et al. | |
| 3,010,889 A | 11/1961 | Fortescue et al. | |
| 3,018,239 A | 1/1962 | Happell et al. | |
| 3,029,130 A | 4/1962 | Moore | |
| 3,046,212 A | 7/1962 | Anderson | |
| 3,063,923 A | 11/1962 | Mayer | |
| 3,136,700 A | 6/1964 | Poppendiek et al. | |
| 3,178,356 A | 4/1965 | Wheelock | |
| 3,216,901 A | 11/1965 | Teitel | |
| 3,218,160 A | 11/1965 | Knighton et al. | |
| 3,262,856 A | 7/1966 | Bettis | |
| 3,275,422 A | 9/1966 | Cathers et al. | |
| 3,287,225 A | 11/1966 | Ackroyd et al. | |
| 3,287,278 A | 11/1966 | Thoma | |
| 3,309,279 A * | 3/1967 | Ritz | G21D 5/06 |
| | | | 976/DIG. 18 |
| 3,368,945 A | 2/1968 | Keller et al. | |
| 3,383,285 A | 5/1968 | Ackroyd et al. | |
| 3,450,198 A | 6/1969 | Brunner | |
| 3,466,227 A * | 9/1969 | Finch | G21C 11/02 |
| | | | 250/517.1 |
| 3,488,253 A * | 1/1970 | Yevick | G21C 7/22 |
| | | | 376/361 |
| 3,503,849 A * | 3/1970 | Yevick | G21C 3/334 |
| | | | 376/280 |
| 3,506,540 A * | 4/1970 | Yevick | G21C 13/067 |
| | | | 976/DIG. 176 |
| 3,518,163 A * | 6/1970 | De Boisblanc | G21C 1/022 |
| | | | 376/205 |
| 3,575,808 A * | 4/1971 | Jakub et al. | G21C 1/028 |
| | | | 376/361 |
| 3,715,318 A | 2/1973 | Hogg | |
| 3,743,577 A | 7/1973 | Bettis et al. | |
| 3,785,924 A | 1/1974 | Notari | |
| 3,909,351 A | 9/1975 | Tilliette | |
| 3,996,099 A | 12/1976 | Faugeras et al. | |
| 3,997,413 A | 12/1976 | Fougner | |
| 4,039,377 A * | 8/1977 | Andrieu | G21C 1/322 |
| | | | 976/DIG. 200 |
| 4,045,286 A | 8/1977 | Blum et al. | |
| 4,056,435 A | 11/1977 | Carlier et al. | |
| 4,216,821 A | 8/1980 | Robin | |
| 4,284,473 A | 8/1981 | Kasama | |
| 4,309,252 A | 1/1982 | Gilroy | |
| 4,331,512 A * | 5/1982 | Facha | G21C 1/03 |
| | | | 976/DIG. 210 |
| 4,342,721 A | 8/1982 | Pomie | |
| 4,351,794 A * | 9/1982 | Artaud | G21C 1/03 |
| | | | 376/292 |
| 4,397,778 A | 8/1983 | Lloyd | |
| 4,639,350 A | 1/1987 | Malaval | |
| 4,762,667 A | 8/1988 | Sharbaugh | |
| 4,786,464 A | 11/1988 | Bardot | |
| 4,820,476 A | 4/1989 | Popalis | |
| 5,185,120 A | 2/1993 | Fennern | |
| 5,196,159 A | 3/1993 | Kawashima et al. | |
| 5,223,210 A | 6/1993 | Hunsbedt et al. | |
| 5,380,406 A | 1/1995 | Horton et al. | |
| 5,421,855 A | 6/1995 | Hayden et al. | |
| 5,596,611 A | 1/1997 | Ball | |
| 5,730,874 A | 3/1998 | Wai et al. | |
| 5,770,085 A | 6/1998 | Wai et al. | |
| 5,792,357 A | 8/1998 | Wai et al. | |
| 5,910,971 A | 6/1999 | Ponomarev-Stepnoy et al. | |
| 6,181,759 B1 | 1/2001 | Heibel | |
| 7,217,402 B1 | 5/2007 | Miller et al. | |
| 8,132,410 B2 | 3/2012 | Oh et al. | |
| 8,416,908 B2 | 4/2013 | Mann | |
| 8,529,713 B2 | 9/2013 | Ahlfeld et al. | |
| 8,594,268 B2 | 11/2013 | Shu | |
| 8,734,738 B1 | 5/2014 | Herrmann | |
| 9,171,646 B2 | 10/2015 | Moses et al. | |
| 9,721,678 B2 | 8/2017 | Cheatham et al. | |
| 9,881,700 B2 | 1/2018 | LeBLANC | |
| 10,043,594 B2 | 8/2018 | Scott | |
| 10,141,079 B2 | 11/2018 | Czerwinski et al. | |
| 10,395,787 B2 | 8/2019 | Sumita et al. | |
| 10,438,705 B2 | 10/2019 | Cheatham | |
| 10,497,479 B2 | 12/2019 | Abbott et al. | |
| 10,566,096 B2 | 2/2020 | Czerwinski et al. | |
| 10,734,122 B2 | 8/2020 | Cisneros et al. | |
| 10,867,710 B2 | 12/2020 | Cisneros et al. | |
| 10,878,969 B2 | 12/2020 | Huke et al. | |
| 11,170,901 B2 | 11/2021 | Cheatham et al. | |
| 11,367,536 B2 | 6/2022 | Abbott et al. | |
| 12,049,408 B2 | 7/2024 | Kelleher | |
| 2004/0114703 A1 | 6/2004 | Bolton et al. | |
| 2005/0220251 A1 | 10/2005 | Yokoyama et al. | |
| 2008/0232533 A1 | 9/2008 | Blanovsky | |
| 2008/0273650 A1 | 11/2008 | Yokoyama et al. | |
| 2008/0310575 A1 * | 12/2008 | Cinotti | |
| 2009/0279658 A1 * | 11/2009 | Leblanc | G21C 3/22 |
| | | | 376/360 |
| 2010/0226471 A1 | 9/2010 | Cinotti | |
| 2010/0254501 A1 | 10/2010 | Ahlfeld et al. | |
| 2011/0131991 A1 | 6/2011 | Oh et al. | |
| 2011/0222642 A1 | 9/2011 | Gautier | |
| 2011/0286563 A1 | 11/2011 | Moses et al. | |
| 2011/0286565 A1 | 11/2011 | Tsang | |
| 2011/0305309 A1 | 12/2011 | Brown | |
| 2012/0027156 A1 | 2/2012 | Peterson | |
| 2012/0051481 A1 | 3/2012 | Shu | |
| 2012/0056125 A1 | 3/2012 | Raade et al. | |
| 2012/0069946 A1 | 3/2012 | Hamill et al. | |
| 2012/0183112 A1 | 7/2012 | LeBlanc | |
| 2012/0228788 A1 | 9/2012 | Jankowiak et al. | |
| 2012/0275558 A1 | 11/2012 | Cinotti | |
| 2012/0288048 A1 | 11/2012 | Mann | |
| 2012/0314829 A1 | 12/2012 | Greene | |
| 2013/0083878 A1 | 4/2013 | Massie et al. | |
| 2013/0180520 A1 | 7/2013 | Raade et al. | |
| 2013/0272470 A1 | 10/2013 | Whitten et al. | |
| 2014/0023172 A1 * | 1/2014 | Leblanc | G21C 5/18 |
| | | | 376/360 |
| 2014/0166924 A1 | 6/2014 | Raade et al. | |
| 2014/0254740 A1 | 9/2014 | Ledford et al. | |
| 2014/0348287 A1 | 11/2014 | Huke et al. | |
| 2015/0010875 A1 | 1/2015 | Raade et al. | |
| 2015/0036779 A1 | 2/2015 | LeBlanc | |
| 2015/0078504 A1 | 3/2015 | Woolley | |
| 2015/0117589 A1 | 4/2015 | Kamei | |
| 2015/0170766 A1 | 6/2015 | Singh et al. | |
| 2015/0228363 A1 | 8/2015 | Dewan et al. | |
| 2015/0243376 A1 | 8/2015 | Wilson | |
| 2015/0310943 A1 * | 10/2015 | Kielb | G21C 1/086 |
| | | | 376/399 |
| 2015/0357056 A1 | 12/2015 | Shayer | |
| 2016/0005497 A1 | 1/2016 | Scott | |

(56) References Cited

U.S. PATENT DOCUMENTS

| | | | |
|---|---|---|---|
| 2016/0189806 A1 | 6/2016 | Cheatham et al. | |
| 2016/0189812 A1 | 6/2016 | Czerwinski et al. | |
| 2016/0189813 A1 | 6/2016 | Cisneros et al. | |
| 2016/0189816 A1 | 6/2016 | Czerwinski et al. | |
| 2016/0196885 A1 | 7/2016 | Singh | |
| 2016/0217874 A1 | 7/2016 | Dewan et al. | |
| 2016/0260505 A1 | 9/2016 | Cadell et al. | |
| 2016/0260509 A1 | 9/2016 | Kim et al. | |
| 2016/0300628 A1 | 10/2016 | Fortino et al. | |
| 2017/0084355 A1 | 3/2017 | Scott | |
| 2017/0092381 A1 | 3/2017 | Cisneros et al. | |
| 2017/0117065 A1 | 4/2017 | Scott | |
| 2017/0213610 A1 | 7/2017 | Sumita | |
| 2017/0301413 A1 | 10/2017 | Cisneros et al. | |
| 2017/0301418 A1 | 10/2017 | Dodson et al. | |
| 2017/0301421 A1 | 10/2017 | Abbott et al. | |
| 2017/0316840 A1 | 11/2017 | Abbott et al. | |
| 2017/0316841 A1 | 11/2017 | Abbott et al. | |
| 2018/0019025 A1 | 1/2018 | Abbott et al. | |
| 2018/0047467 A1 | 2/2018 | Czerwinski et al. | |
| 2018/0068750 A1 | 3/2018 | Cisneros et al. | |
| 2018/0137944 A1 | 5/2018 | Abbott et al. | |
| 2018/0277260 A1 | 9/2018 | Marcille et al. | |
| 2019/0139665 A1 | 5/2019 | Czerwinski et al. | |
| 2019/0172594 A1 | 6/2019 | Lyons et al. | |
| 2019/0237205 A1 | 8/2019 | Abbott et al. | |
| 2019/0311816 A1 | 10/2019 | Sumita et al. | |
| 2020/0002828 A1* | 1/2020 | Mills | G21B 1/15 |
| 2020/0027590 A1 | 1/2020 | Cisneros et al. | |
| 2020/0087156 A1 | 3/2020 | Kelleher | |
| 2020/0118698 A1 | 4/2020 | Cheatham et al. | |
| 2020/0122109 A1 | 4/2020 | Kruizenga et al. | |
| 2020/0185114 A1 | 6/2020 | Abbott et al. | |
| 2020/0211724 A1 | 7/2020 | Cisneros et al. | |
| 2020/0251231 A1 | 8/2020 | Czerwinski et al. | |
| 2020/0357531 A1 | 11/2020 | Inman et al. | |
| 2020/0373029 A1 | 11/2020 | McCLURE et al. | |
| 2021/0202117 A1 | 7/2021 | Nelson | |
| 2022/0076854 A1 | 3/2022 | Ougouag et al. | |

FOREIGN PATENT DOCUMENTS

| | | | | |
|---|---|---|---|---|
| CN | 1150310 A | 5/1997 | | |
| CN | 1242099 A | 1/2000 | | |
| CN | 1922695 A | 2/2007 | | |
| CN | 101323793 A | 12/2008 | | |
| CN | 101777392 A | 7/2010 | | |
| CN | 101861627 A | 10/2010 | | |
| CN | 101939793 B | 1/2011 | | |
| CN | 102460591 A | 5/2012 | | |
| CN | 102549674 A | 7/2012 | | |
| CN | 102590253 A | 7/2012 | | |
| CN | 102834670 A | 12/2012 | | |
| CN | 103263849 A | 8/2013 | | |
| CN | 103544996 A | 1/2014 | | |
| CN | 103971769 A | 8/2014 | | |
| CN | 104145309 A1 | 11/2014 | | |
| CN | 104183277 A | 12/2014 | | |
| CN | 104205237 A | 12/2014 | | |
| CN | 104428839 A | 3/2015 | | |
| CN | 105023621 A | 11/2015 | | |
| CN | 105027224 A | 11/2015 | | |
| CN | 105321584 A | 2/2016 | | |
| CN | 105359220 A | 2/2016 | | |
| CN | 105684090 A | 6/2016 | | |
| CN | 107112055 A | 8/2017 | | |
| CN | 108780666 A | 11/2018 | | |
| CN | 107004446 B | 9/2019 | | |
| CN | 107112055 B | 9/2020 | | |
| CN | 201580071735.6 | 9/2020 | | |
| DE | 1112791 B | 10/1963 | | |
| DE | 1439107 A1 | 2/1969 | | |
| EP | 0617430 A1 * | 9/1994 | | |
| EP | 2887357 A1 | 6/2015 | | |
| EP | 3357068 A0 | 8/2018 | | |
| EP | 3570680 A1 | 11/2019 | | |
| FR | 2296248 A1 | 7/1976 | | |
| FR | 2529370 A1 | 12/1983 | | |
| GB | 739968 A | 11/1955 | | |
| GB | 835266 A | 5/1960 | | |
| GB | 964841 A | 7/1964 | | |
| GB | 2073938 A | 10/1981 | | |
| GB | 2098788 A * | 11/1982 | | G21C 1/22 |
| GB | 2073938 B | 7/1984 | | |
| GB | 2508537 A | 6/2014 | | |
| GB | 2511113 A | 8/2014 | | |
| GB | 2508537 B | 12/2014 | | |
| GB | 2516046 A | 1/2015 | | |
| JP | 35013995 B | 9/1960 | | |
| JP | S54126887 A | 10/1979 | | |
| JP | 571991 A | 1/1982 | | |
| JP | S571991 B2 | 1/1982 | | |
| JP | S57101991 A | 6/1982 | | |
| JP | 1991282397 A | 12/1991 | | |
| JP | 11174194 A | 7/1999 | | |
| JP | 06174882 A | 1/2001 | | |
| JP | 2001133572 A | 5/2001 | | |
| JP | 2003063801 A | 3/2003 | | |
| JP | 2005208065 A | 8/2005 | | |
| JP | 2010223942 A | 10/2010 | | |
| JP | 2012047531 A | 3/2012 | | |
| JP | 2014119429 A | 12/2012 | | |
| JP | 2013250056 A | 12/2013 | | |
| JP | 2014506998 A | 3/2014 | | |
| JP | 2014510284 A | 4/2014 | | |
| JP | 2014139268 A | 7/2014 | | |
| JP | 2014145106 A | 8/2014 | | |
| JP | 2014534413 A | 12/2014 | | |
| JP | 2015040751 A | 3/2015 | | |
| JP | 2015510588 A | 4/2015 | | |
| JP | 2016512880 A | 5/2016 | | |
| KR | 101107095 B1 | 1/2012 | | |
| KR | 20140074355 A | 6/2014 | | |
| KR | 20140123089 A | 10/2014 | | |
| KR | 20150122165 A | 10/2015 | | |
| KR | 102166205 B1 | 10/2020 | | |
| RU | 1746827 A1 | 2/1997 | | |
| RU | 57040 U1 | 9/2006 | | |
| RU | 2424587 C1 | 7/2011 | | |
| WO | 1999059160 A1 | 11/1999 | | |
| WO | 200003399 A1 | 1/2000 | | |
| WO | WO-2009135286 A1 * | 11/2009 | | G21C 1/22 |
| WO | 2013085383 A1 | 6/2013 | | |
| WO | 2013116942 A1 | 8/2013 | | |
| WO | 2013180029 A1 | 12/2013 | | |
| WO | 2014039641 A2 | 3/2014 | | |
| WO | 2014074930 A1 | 5/2014 | | |
| WO | 2014128457 A1 | 8/2014 | | |
| WO | 2014196338 A1 | 12/2014 | | |
| WO | 2015038922 A1 | 3/2015 | | |
| WO | 2015140495 A1 | 9/2015 | | |
| WO | 2016109565 A2 | 7/2016 | | |
| WO | 2016197807 A1 | 12/2016 | | |
| WO | 2018013317 A1 | 1/2018 | | |
| WO | 20180264292 A2 | 2/2018 | | |
| WO | 2021133952 A2 | 7/2021 | | |

OTHER PUBLICATIONS

Gandini, A. "Hot point detection method." Annals of Nuclear Energy 38.12 (2011): 2843-2847. (Year: 2011).*

Abbott et al, Thermal and Mechanical Design Aspects of the LIFE Engine, Fusion Science and Technology Dec. 2008;56(2).

Andreades et al., Technical Description of the Mark 1 Pebble-Bed Fluoride-Salt-Cooled High-Temperature Reactor (PB-FHR) Power Plant, Department of Nuclear Engineering, University of California, Berkeley (Sep. 30, 2014), 153 pages.

Andreades, Design Summary of the Mark-I Pebble-Bed, Fluoride Salt-Cooled, High-Temperature Reactor Commercial Power Plant, Nuclear Technology, vol. 195(3), 223-238, Sep. 2016. This reference was cited in OA dated Aug. 18, 2022 in matter No. 21-006-CP1-US-INN./rt.

(56) References Cited

OTHER PUBLICATIONS

Ashraf-Khorassani, Mehdi, Michael T. Combs, and Larry T. Taylor. "Solubility of metal chelates and their extraction from an aqueous environment via supercritical CO2." Talanta 44.5 (1997): 755-763.

ASTM International, Designation: B898-11, Standard Specification for Reactive and Refractory Metal Clad Plate (Sep. 2011), 15 pages.

Bertch, T.C., Selective Gaseous Extraction Research, Development and Training for Isotope Production, Final Technical Report for the Period Apr. 1, 2012 through Mar. 31, 2014, General Atomics, 27 pgs.

Borts, B., et al. "The study of supercritical extraction of complexes of molybdenum with carbon dioxide." 6 (6) (2016):57-63.

Chapter 20, Creeping Flow, Physics of Continuous Matter, Exotic and Everyday Phenomena in the Macroscopic World, Lautrup, B., The Niels Bohr Institute, Copenhagen, Denmark, 2004.

Chou, Wei-Lung, et al., "Removal of gallium (iii) ions from acidic aqueous solution by supercritical carbon dioxide extraction in the green separation process." Journal of hazardous materials 160.1 (2008): 6-12.

Clarno, K.T. et al., "Trade studies for the liquid-salt-cooled very high-temperature reactor: fiscal year 2006 progress report", ORNL/TM-2006 140 (2007), 35 pgs.

Cohen et al., "Vanadium-Lined HT9 Cladding Tubes", Argonne National Lab ANL/ET/CP-80384, (Feb. 1994), 12 pgs.

Donnelly et al., Fabrication of Heat Exchanger Tube Bundle for the Molten-Salt Reactor Experiment, ORNL-3500, Dec. 9, 1963.

EESR EP15875826.8 European Extended Search Report in European Application EP15875826.8, mailed Sep. 6, 2018, 7 pages.

EP14863738.2 European Extended Search Report for EP 14863738.2 dated Jun. 2, 2017, 11 pages.

EP15876187.4 European Extended Search Report for EP 15876187.4 dated Sep. 11, 2018, 10 pages.

ESR20211581.2 European Extended Search Report in European Application EP 20 21 1581.2, mailed Mar. 24, 2021, 8 pages.

Forsberg et al., Fluoride-Salt-Cooled High-Temperature Reactor (FHR) Commercial Basis and Commercialization Strategy, MIT Center for Advanced Nuclear Energy Systems, MIT-ANP-TR-153, Dec. 2014, 148 pgs.

Forsberg et al., Fluoride-Salt-Cooled High-Temperature Reactor (FHR) for Power and Process Heat, Final Project Report, MIT-ANP-TR-157, Dec. 2014, 62 pgs.

Forsberg et al., Fluoride-Salt-Cooled High-Temperature Reactor (FHR): Goals, Options, Ownership, Requirements, Design, Licensing, and Support Facilities, MIT Center for Advanced Nuclear Energy Systems, MIT-ANP-TR-154, Dec. 2014, 217 pgs.

Forsberg, Appendix D: Test Reactor Workshop Conclusions, NEUP Integrated Research Project Workshop 6: Fluoride Salt-Cooled High Temperature Reactor (FHR) Test Reactor Goals; Designs, and Strategies, Oct. 2-3, 2014, 11 pages.

Freeman et al., "Archimedes Plasma Mass Filter," AIP Conf. Proc. 694, 403 (2003).

Gen IV International Forum, Molten Salt Reactor (MSR), https://www.gen-4.org/gif/jcms/c_9359/msr, accessed Feb. 26, 2016, 3 pgs.

Grimes, W. R., "Molten-Salt Reactor Chemistry," Nucl. Appl. Technol. vol 8, 137-155 (1970).

Harder, B.R., Long, G., and Stanaway, W.P., "Compatibility and Processing Problems in the Use of Molten Uranium Chloride-Alkali Chloride Mixtures as Reactor Fuels," Symposium on Reprocessing of Nuclear Fuels, Iowa State University, 405-432, 28 pages, Aug. 1969.

Holcomb, et al. Fast Spectrum Molten Salt Reactor Options, Jul. 2011, 46 pages. Available at: http://info.ornl.gov/sites/publications/files/Pub29596.pdf.

Hung, Laurence, et al. "Supercritical CO2 extraction of molybdenum-ligand complexes from sulfuric solutions." The Journal of Supercritical Fluids 111 (2016): 97-103.

Kimura—Neutron Spectrum in Small Iron Pile Surrounded by Lead Reflector, Journal of Nuclear Science and Technology, 15(3), pp. 183-191 (Mar. 1978).

Kramer et al., Fusion-Fission Blanket Options for the LIFE Engine, Fusion Science and Technology, vol. 60, pp. 72-77, Jul. 2011.

Kramer et al., Parameter study of the LIFE engine nuclear design, Energy Conversion and Management, 51, pp. 1744-1750, 2010.

Kuznetsov et al., Electrochemical Behavior and Some Thermodynamic Properties of UC1 [sub 4] and UC1 [sub 3] Dissolved in a LiC1-KC1 Eutectic Melt, Journal of the Electrochemical Society, vol. 152, No. 4, Jan. 2005, 11 pages.

Li, et al., "Affinity Extraction into CO2. 2. Extraction of Heavy Metals into C02 from Low-pH Aqueous Solutions", Ind. Eng. Chem. Res. 37:4763-4773 (1998).

Lin et al., "Supercritical fluid extraction and chromatography of metal chelates and organometallic compounds" trends in analytical chemistry 14(3):123-133 (1995).

Maltsev et al., Redox potentials of uranium in molten eutectic mixture of lithium, potassium, and cesium chlorides, Russian Metallurgy, Maiknauka—Interperidica, RU, vol. 2016, No. 8, Dec. 2016.

Mekki et al., "Extraction of Lanthanides from Aqueous Solution by Using Room-Temperature Ionic Liquid and Supercritical Carbon Dioxide in Conjunction" Chem. Eur. J. 12:1760-1766 (2006).

Merle-Lucotte, E., Introduction to the Physics of the Molten Salt Fast Reactor, Thorium Energy Conference 2013 (ThEC13), 2013.

Molten Salt Reactor (MSR) Review: Feasibility Study of developing a pilot scale molten salt reactor in the UK, Jul. 2015, Energy Process Development, LTD (available at www.energyprocessdevelopments.com).

Mourogov et al., Potentialities of the fast spectrum molten salt reactor concept: REBUS-3700, Energy Conversion and Management, Mar. 30, 2006, vol. 47, No. 17, pp. 2761-2771.

MSR-FUJI General Information, Technical Features, and Operating Characteristics.

ORNL-2474 (Oak Ridge National Laboratory), Molten-Salt Reactor Program Quarterly Progress Report for Period Ending Jan. 31, 1958, H.G. MacPherson, Program Director, Date Issued May 1, 1958, pp. 41-44.

Ottewitte, E. H. , "Configuration of a Molten Chloride Fast Reactor on a Thorium Fuel Cycle to Current Nuclear Fuel Cycle Concerns," Ph.D. dissertation, University of California at Los Angeles, 1982.

Ottewitte, E. H., Cursory First Look at the Molten Chloride Fast Reactor as an Alternative to the Conventional BATR Concept.

Patent Search Report, Eurasian Patent Office, Eurasian application No. 202193104 Jun. 13, 2022—Search report sent in FA eml dated Jun. 12, 2022./rt.

PCT/US2015/000499 IPRP + WO—International Preliminary Report on Patentability and Written Opinion in International Application PCT/US2015/000499, mailed Jul. 4, 2017, 9 pages.

PCT/US2015/000499 ISR + WO—International Search Report and Written Opinion in International Application PCT/US2015/000499, mailed Jul. 22, 2016, 11 pages.

PCT/US2015/067704 IPRP + WO—International Preliminary Report on Patentability and Written Opinion mailed Jul. 4, 2017, 7 pages.

PCT/US2015/067704 ISR + WO—International Search Report and Written Opinion.

PCT/US2015/067905 IPRP—International Preliminary Report on Patentability mailed Jul. 4, 2017, 14 pages.

PCT/US2015/067905 ISR + WO—International Search Report and Written Opinion in International Application PCT/ US2015/067905 mailed Aug. 5, 2016, 18 pages.

PCT/US2015/067923 IPRP—International Preliminary Report on Patentability mailed Jul. 4, 2017, 7 pages.

PCT/US2015/067923 ISR + WO—International Search Report and Written Opinion in International Application PCT/US2015/067923, mailed Apr. 19, 2016.

International Search Report and Written Opinion, PCT/US2017/046139, Jan. 17, 2018, 16 pages.

International Search Report and Written Opinion, PCT/US2019/021791, Mar. 12, 2019, 15 pages.

International Preliminary Report on Patentability, PCT/US2017/061843, May 21, 2019, 13 pages.

International Search Report and Written Opinion, PCT/US2019/51345, Sep. 16, 2019, 15 pages.

(56)           References Cited

OTHER PUBLICATIONS

International Preliminary Report on Patentability, PCT/US2016/055001, Apr. 3, 2018, 8 pages.
International Search Report and Written Opinion, PCT/US2016/055001, Jan. 25, 2017, 14 pages.
International Preliminary Report on Patentability, PCT/US2017/030455, Nov. 6, 2018, 17 pages.
International Preliminary Report on Patentability, PCT/US2017/030457, Nov. 6, 2018, 15 pages.
International Search Report and Written Opinion, PCT/US2017/030457, Oct. 18, 2017, 31 pages.
International Preliminary Report on Patentability, PCT/US2017/030666, Nov. 6, 2018, 9 pages.
International Search Report and Written Opinion, PCT/US2017/030666, Jul. 20, 2017, 11 pages.
International Preliminary Report on Patentability, PCT/US2017/030672, Nov. 6, 2018, 7 pages.
International Search Report and Written Opinion, PCT/US2017/030672, Sep. 19, 2017, 11 pages.
International Search Report and Written Opinion, PCT/US2017/038806, Sep. 21, 2017, 9 pages.
International Preliminary Report on Patentability, PCT/US2017/038806, Jan. 15, 2019, 7 pages.
International Preliminary Report on Patentability, PCT/US2017/046139, Feb. 12, 2019, 8 pages.
International Search Report and Written Opinion, PCT/US2017/061843, Oct. 29, 2018, 35 pages.
International Search Report and Written Opinion, PCT/US2019/015967, Apr. 5, 2019, 20 pages.
International Preliminary Report on Patentability, PCT/US2019/015967, Aug. 4, 2020, 16 pages.
International Preliminary Report on Patentability, PCT/US2019/021791, Sep. 15, 2020, 8 pages.
International Search Report and Written Opinion, PCT/US2020/066599, May 17, 2021, 17 pages.
International Search Report and Written Opinion, PCT/US2020/066908, Aug. 16, 2021, 22 pages.
Reactor Training Course Experiment, "Reactor Start-up Procedure", Technical University, Dresden, Nov. 29, 2021, 22 pages.
"Preliminary Thermal-Hydraulic Core Design of the Molten Salt Fast Reactor",Rouch et al., Elsevier Journal, Sep. 3, 2013, 8 pages.
"Fuel Cycle Performance of Fast Spectrum Molten Salt Reactor Designs", Rykhlevskii et al., Department of Nuclear, Plasma, and Radiological Engineering, University of Illinois, Aug. 25, 2019, 13 pages.
"Small Modular Molten Salt Reactor", Sabharwall et al., Proceedings for the ASME 2011 Small Modular Reactors Symposium, Washington, D.C., Sep. 28-30, 9 pages.
"The Simple Molten Salt Reactor", Scott et al.,Molten Energy LLP, Aug. 26, 2018, 19 pages.
"Safer, cheaper nuclear: The simple molten salt reactor", Scott et al., EE Publishers, Mar. 18, 2020, 9 pages.
"Conceptual Design Study on Fast Reactor Fuel Preprocessing System Using Super-Direx Process", Takata et al., Proceedings of ICONE12, 12th International Conference on Nuclear Engineering, Apr. 25-29, Arlington, Virgina, 6 pages.
"Molten Plutonium Chlorides Fast Breeder Reactor Cooled by Molten Uranium Chloride", Taube et al., Annals of Nuclear Science and Engineering, 1974, vol. 1, pp. 277-281.
"Chemical Aspects of MSRE Operations", Roy E. Thoma, Oak Ridge National Laboratory, 1971, 151 pages.
Technical White Paper, Transatomic Power, V.1.0.1, Mar. 2014, 34 pages.
"Simulation of fast molten salt reactor", R.J.S. van 't Eind, Jul. 2011, 68 pages.
"Supercritical Fluid Extraction of Trace Metals from Solid and Liquid Materials for Analytical Applications", C.M. Wai, Analytical Sciences, vol. II, Feb. 1995, 3 pages.
"Suprecritical fluid extraction: metals as complexes" C.M. Wai, Elsevier, Journal of Chromotography, 1997, pp. 369-383.

"Extraction of Uranium from Aqueous Solutions by Using Ionic Liquid and Supercritical Carbon Dioxide in Conjunction", Wang et al., Chemistry—A European Journal, 2009, 6 pages.
"Influence of MgCl2 content on corrosion behavior of GH1140 in molten NaCl-MgCl2 as thermal storage medium", Wang et al., Elsevier, Solar Energy Materials and Solar Cells, Nov. 20, 2017, pp. 194-201.
"Appication of Supercritical Fluid Extraction Technology on the Treatment of Nuclear Waste", Wang et al., Applied Chemistry, vol. 20, No. 5, May 31, 2003, pp. 409-414.
"Thorium Energy R&D in China", Xu et al., Shanghai Institute of Applied Physics, Shanghai China, Oct. 28, 2013, 59 pages.
"Experimental investigation of the MSFR molten salt reactor concept", Yamaji et al., Kerntechnik, 2014, pp. 408-416.
"Experimental Modelling and Numerical Analysis of a Molten Salt Fast Reactor", Yamaji et al., Oct. 3, 2014, 9 pages.
"Experimental and numerical thermal-hydraulics investigation of molten salt reactor concept core" Yamaji et al., 2017, 11 pages.
"Thermal-hudraulic analysis and experimental modelling MSFR", Yamaji et al., Elsevier, Annals of Nuclear Energy, 2014, 15 pages.
"Review—Use of ionic liquids as 'green' solvents for extractions", Zhao et al., Journal of Chemical Technology and Biotechnology, 2005, 8 pages.
"Extraction of Actinides and Lanthanides by Supercritical Fluid", Zhu et al., 2011, 8 pages.
Adamson G.M., et al., "Interim Report on Corrosion By Alkali-Metal Fluorides: Work to May 1, 1953," Oak Ridge National Laboratory, Oak Ridge, Tennessee, ORNL-2337, Mar. 20, 1959, 45 Pages.
Adamson G.M., et al., "Interim Report on Corrosion by Zirconium-Base Fluorides," ORNL-2338 UC-25—Metallurgy and Ceramics, Oak Ridge National Laboratory, Oak Ridge, TN, Jan. 3, 1961, 57 Pages.
Afonichkin V.K., et al., "Dynamic Reference Electrode for Investigation of Fluoride Melts Containing Beryllium Difluoride," Journal of Fluorine Chemistry, 2009, vol. 130, pp. 83-88.
AHR: "Reactor Start-up Procedure," Technical University Dresden, Institute of Power Engineering Training Reactor, Mar. 2015, 21 Pages, Retrieved from URL: https://tu-dresden.de/ing/maschinenwesen/iet/wket/ressourcen/dateien/akr2/Lehrmaterialien/start_e.pdf?lang=en.
ASTM International: "B407-08a Standard Specification for Nickel-Iron-Chromium Alloy Seamless Pipe and Tube," West Conshohocken, PA, 2019, 06 Pages.
ASTM International: "Standard Practice for Cleaning, Descaling, and Passivation of Stainless Steel Parts, Equipment, and Systems," ASTM International A380/A380M-17, West Conshohocken, PA, Sep. 2017, 13 Pages.
ASTM International: "Standard Specification for Seamless, Welded, and Heavily Cold Worked Austenitic Stainless Steel Pipes" ASTM International, A312/A312M-17, West Conshohocken, PA, Mar. 15, 2017, 13 Pages.
Bauman H.F., et al., "Molten-Salt Reactor Concepts With Reduced Potential for Proliferation of Special Nuclear Materials," Orau/Iea (M)-77-13, Institute for Energy Analysis, Oak Ridge, TN (USA), Research Memorandum, Feb. 1977, 38 Pages.
Blood C.M., "Solubility and Stability of Structural Metal Difluorides in Molten Fluoride Mixtures," Oak Ridge National Laboratory, ORNL-TM-760, Jan. 9, 1964, 53 Pages.
Ding W., et al., "Hot Corrosion Behavior of Commercial Alloys in Thermal Energy Storage Material of Molten MgCl2/KCl/NaCl Under Inert Atmosphere," Solar Energy Materials and Solar Cells, May 2018, pp. 1-20 (22 Pages).
Ding W., et al., "Molten Chloride Salts for Next Generation Concentrated Solar Power Plants: Mitigation Strategies Against Corrosion of Structural Materials," Solar Energy Materials and Solar Cells, 2019, vol. 193, pp. 298-313, Published Online on Jan. 30, 2019.
Eiselstein H.L., et al., "The Invention and Definition of Alloy 625," Inco Alloys International Inc, T he Minerals, Metals Materials Society, Super alloys 718, 625, and Various Derivatives, 1991, pp. 1-14.

(56)         References Cited

OTHER PUBLICATIONS

Evans R.B., et al., "Corrosion in Polythermal Loop Systems Ii. A Solid-State Diffusion Mechanism With and Without Liquid Film Effects," Oak Ridge National Laboratory , Oak Ridge, Tennessee, ORNL-4575, Jun. 1971, vol. 2, 77 Pages.

Extended European Search Report for European Application No. 21187359.1 , dated Oct. 27, 2021, 07 Pages.

Floreen S., et al., "The Metallurgy of Alloy 625," Superalloys 718, 625, and Various Derivatives, The Minerals, Metals Materials Society, 1994, pp. 13-37.

Gehin J.C., et al., "Liquid Fuel Molten Salt Reactors for Thorium Utilization," Nuclear Technology, May 2016, vol. 194, No. 2, pp. 152-161.

Gomez-Vidal J.C., et al., "Corrosion of Alloys in a Chloride Molten Salt (NaCI-LiCI) for Solar Thermal Technologies" Solar Energy Materials Solar Cells, 2016, vol. 157, pp. 234-244.

Guo S., et al., "Corrosion in the Molten Fluoride and Chloride Salts and Materials Development for Nuclear Applications," Progress in Materials Science, May 14, 2018, pp. 1-111 (112 Pages).

Hastelloy: "Hastelloy C-276 Alloy - Brochure," 2022, 1 Page, Accessed on [2022-02-01], Retrived from URL: https://haynesintl.com/en/alloys/alloy-portfolio/corrosion-resistant-alloys/hastelloy-c-276/.

International Search Report and Written Opinion for International Application No. PCT/US2017/030455, dated Jan. 30, 2018, 23 Pages.

Johnson T.R., et al., "A Method for the Purification of Molten Chloride Salts," Technical Report ANL-7603, Argonne National Laboratory, Argonne, Illinois, Chemical Engineering Division, Aug. 1969, 20 Pages.

Keiser J.R., et al., "The Corrosion Resistance of Type 316 Stainless Steel to Li2BeF4," Oak Ridge National Laboratory, Oak Ridge, Tennessee, ORNL-TM-5782, Apr. 1977, pp. 1-24.

Koger J.W., "Alloy Compatibility with LiF-BeF2 Salts Containing ThF4 and UF4," Technical Paper ORNL-TM-4286, Oak Ridge National Laboratory, Oak Ridge, Tennessee, Dec. 1972, 46 Pages.

Koger J.W., "Corrosion and Mass Transfer Characteristics of NaBF4-NaF (92-8 mole %) in Hastelloy N," Oak Ridge National Laboratory, ORNL-TM-3866, Oak Ridge, Tennessee, Oct. 6, 1972, 82 Pages.

Koger J.W., "Effect of FeF2 Addition on Mass Transfer in a Hastelloy N - LiF-BeF2-UF4 Thermal Convection Loop System," Oak Ridge National Laboratory, Oak Ridge Tennessee, ORNL-TM-4188, Dec. 1972, 30 Pages.

Koger J.W., "Evaluation of Hastelloy N Alloys After Nine Years Exposure to Both a Molten Fluoride Salt and Air at Temperatures from 700 to 560 Degrees C," Oak Ridge National Laboratory, ORNL-TM-4189, Dec. 1972, 46 Pages.

Macpherson H.G., "The Molten Salt Reactor Adventure," Nuclear Science and Engineering, 1985, vol. 90, pp. 374-380.

Manly W.D., et al., "Aircraft Reactor Experiment—Metallurgical Aspects," AEC Research and Development Report, Oak Ridge National Laboratory, ORNL-2349, Dec. 20, 1957, pp. 1-51 (59 Pages).

Mccoy H.E., "The INOR-8 Story," Review-Oak Ridge National Laboratory, Fall, 1969, vol. 3, No. 2, pp. 35-48 (18 Pages).

Mortazavi A., et al., "High-Temperature Corrosion of a Nickel-Based Alloy in a Molten Chloride Environment - The Effect of Thermal and Chemical Purifications," Solar Energy Materials and Solar Cells, 2022, vol. 236, pp. 1-17, Published Online on Dec. 16, 2021.

Raiman S.S., et al., "Aggregation and Data Analysis of Corrosion Studies in Molten Chloride and Fluoride Salts," Journal of Nuclear Materials, 2018, pp. 1-13.

Raseman C.J., et al., "Engineering Experience at Brookhaven National Laboratory in Handling Fused Chloride Salts," Associated Universities Inc, Brookhaven National Laboratory, Upton, N.Y, Jun. 1960, 33 Pages.

Ren W., et al., "Alloy Selection and C-276 Code Design Value Extension for Advanced Molten Salt Technology Test Facilities Experimentation," Proceedings of the ASME 2020 Pressure Vessels Piping Conference PVP2020, Aug. 3, 2020, 9 Pages.

Renault C., et al., "The Molten Salt Reactor (MSR) RD Status and Perspectives in Europe," FISA-MSR, Jan. 20, 2010, 16 Pages.

Richardson L.S., et al., "Corrosion by Molten Fluorides," AEC Research and Development Report, Oak Ridge National Laboratory, ORNL-1491, Sep. 1952, 25 Pages.

Richardson M., "Development of Freeze Valve for Use in the Msre," ORNL, ORNL-TM-128 Oak Ridge National Laboratory, Oak Ridge, Tennessee, Feb. 28, 1962, 28 Pages.

Rosenthal M.W., et al., "Molten-Salt Reactors—History, Status, and Potential," Nuclear Applications and Technology, Feb. 1970, vol. 8, No. 2, pp. 107-117, Published Online May 19, 2017.

Scott I.R., et al., "The Simple Molten Salt Reactor Practical, Safe and Cheap," Moltex Energy LLP, Presentation Slides, 2013, 19 Pages.

Serp J., et al., "The Molten Salt Reactor (MSR) in Generation IV: Overview and Perspectives," Progress in Nuclear Energy, 2014, vol. 77, pp. 308-319.

Shaffer J.H., "Preparation and Handling of Salt Mixtures for the Molten Salt Reactor Experiment," Oak Ridge National Laboratory, ORNL-4616, Oak Ridge, Tennessee, Jan. 1971, 45 Pages.

Special Metals: "The Story of the "INCOLOY Alloys Series," from 800, Through 800H, 800HT," Sep. 2004, pp. 1-16, Retrieved from URL: https://www.specialmetals.com/documents/technical-bulletins/incoloy/incoloy- alloy-800h-800ht.pdf.

Sun H., et al., "Corrosion Behavior of 316SS and Ni-based Alloys in a Ternary NaCI-KCI-MgCI2 Molten Salt," Solar Energy, 2018, vol. 171, pp. 320-329, Published Online Jul. 2, 2018.

Susskind H., et al., "Corrosion Studies for a Fused Salt-Liquid Metal Extraction Process for the Liquid Metal Fuel Reactor," Associated Universities Inc, Brookhaven National Laboratory, Upton, N.Y, Jun. 30, 1960, 46 Pages.

Vidal J.C., et al., "Molten Chloride Technology Pathway to Meet the U.S. Doe SunShot Initiative with Gen3 Csp," Aip Conference Proceedings, National Renewable Energy Laboratory, Golden Colorado, 2019, vol. 2126, No. 080006, p. 080006-1 - 080006-9 (10 Pages), E.Published on: Jul. 26, 2019.

Vignarooban K., et al., "Corrosion Resistance of Hastelloys in Molten Metal-Chloride Heat-Transfer Fluids for Concentrating Solar Power Applications," Solar Energy, 2014, vol. 103, pp. 62-69, Published Online Feb. 28, 2014.

Vijayan P. K., et al., "Scaling Laws for Single-Phase Natural Circulation Loops," Nuclear Engineering and Design, 1994, vol. 152, pp. 331-347.

Vijayan P. K., et al., "On the Steady-State Performance of Natural Circulation Loops," International Journal of Heat and Mass Transfer, 1991, vol. 34, No. 9, pp. 2219-2230, Final Form Jul. 18, 1990.

Williams D.F., "Assessment of Candidate Molten Salt Coolants for the NGNP/NHI Heat-Transfer Loop," Ornl, ORNL-TM-2006/69, Oak Ridge National Laboratory, Oak Ridge, Tennessee, Jun. 2006, 44 Pages.

Zhao Y., "Molten Chloride Thermophysical Properties, Chemical Optimization, and Purification," National Renewable Energy Laboratory, Technical Report NREL/TP-5500-78047, 2020, 94 Pages.

Zheng G., et al., "High-Temperature Corrosion of Uns N10003 in Molten Li2BeF4 (FLiBe) Salt," Corrosion Science Section, Oct. 2015, vol. 71, No. 10, pp. 1257-1266.

* cited by examiner

600

618

1st Zone of Active
Vessel Cooling

630

630

618

618

632

2nd Zone of Active
Vessel Cooling

618

608B

3nd Zone of Active
(But Indirect)
Vessel Cooling

614

606

1st Zone of Active
Vessel Cooling

630

2nd Zone of Active
Vessel Cooling

632

3nd Zone of Active
(But Indirect)
Vessel Cooling

MOLTEN FUEL REACTOR THERMAL MANAGEMENT CONFIGURATIONS

RELATED APPLICATIONS

This application is a divisional of U.S. patent application Ser. No. 16/824,125, filed Mar. 19, 2020 which issued as U.S. Pat. No. 11/367,536 on Jun. 21, 2022, which is a divisional of U.S. patent application Ser. No. 15/584,659, filed May 2, 2017 (now abandoned), which claims priority to U.S. Provisional Application No. 62/330,726, filed May 2, 2016, which are incorporated herein by reference.

INTRODUCTION

The utilization of molten fuels in a nuclear reactor to produce power provides significant advantages as compared to solid fuels. For instance, molten fuel reactors generally provide higher power densities compared to solid fuel reactors, while at the same time having reduced fuel costs due to the relatively high cost of solid fuel fabrication.

Molten fluoride fuel salts suitable for use in nuclear reactors have been developed using uranium tetrafluoride ($UF_4$) mixed with other fluoride salts such as $UF_6$, and $UF_3$. Molten fluoride salt reactors have been operated at average temperatures between 600° C. and 860° C. Binary, ternary, and quaternary chloride fuel salts of uranium, as well as other fissionable elements, have been described in co-assigned U.S. patent application Ser. No. 14/981,512, titled MOLTEN NUCLEAR FUEL SALTS AND RELATED SYSTEMS AND METHODS which application is hereby incorporated herein by reference. In addition to chloride fuel salts containing one or more of $PuCl_3$, $UCl_4$, $UCl_3F$, $UCl_3$, $UCl_2F_2$, and $UClF_3$, the application further discloses fuel salts with modified amounts of $^{37}Cl$, bromide fuel salts such as $UBr_3$ or $UBr_4$, thorium chloride (e.g., $ThCl_4$) fuel salts, and methods and systems for using the fuel salts in a molten fuel reactor. Average operating temperatures of chloride salt reactors are anticipated between 300° C. and 600° C., but could be even higher, e.g., >1000° C.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto. The patent or application file contains at least one drawing executed in color. Copies of this patent or patent application publication with color drawing(s) will be provided by the Office upon request and payment of the necessary fee.

DETAILED DESCRIPTION

This disclosure describes various configurations and components of a molten fuel nuclear reactor. For the purposes of this application, embodiments of a molten fuel reactor that use a chloride fuel, such as a mixture of one or more fuel salts such as $PuCl_3$, $UCl_3$, and/or $UCl_4$ and one or non-fissile salts such as $NaCl$ and/or $MgCl_2$, will be described. However, it will be understood that any type of fuel salt, now known or later developed, may be used and that the technologies described herein may be equally applicable regardless of the type of fuel used. For example, a fuel salt may include one or more non-fissile salts such as, but not limited to, $NaCl$, $MgCl_2$, $CaCl_2$, $BaCl_2$, $KCl$, $SrCl_2$, $VCl_3$, $CrCl_3$, $TiCl_4$, $ZrCl_4$, $ThCl_4$, $AcCl_3$, $NpCl_4$, $AmCl_3$, $LaCl_3$, $CeCl_3$, $PrCl_3$ and/or $NdCl_3$. Note that the minimum and maximum operational temperatures of fuel within a reactor may vary depending on the fuel salt used in order to maintain the salt within the liquid phase throughout the reactor. Minimum temperatures may be as low as 300-350° C. and maximum temperatures may be as high as 1400° C. or higher. Similarly, except were explicitly discussed otherwise, heat exchangers will be generally presented in this disclosure in terms of simple, single pass, shell-and-tube heat exchangers having a set of tubes and with tube sheets at either end. However, it will be understood that, in general, any design of heat exchanger may be used, although some designs may be more suitable than others. For example, in addition to shell and tube heat exchangers, plate, plate and shell, printed circuit, and plate fin heat exchangers may be suitable.

Figure 1:
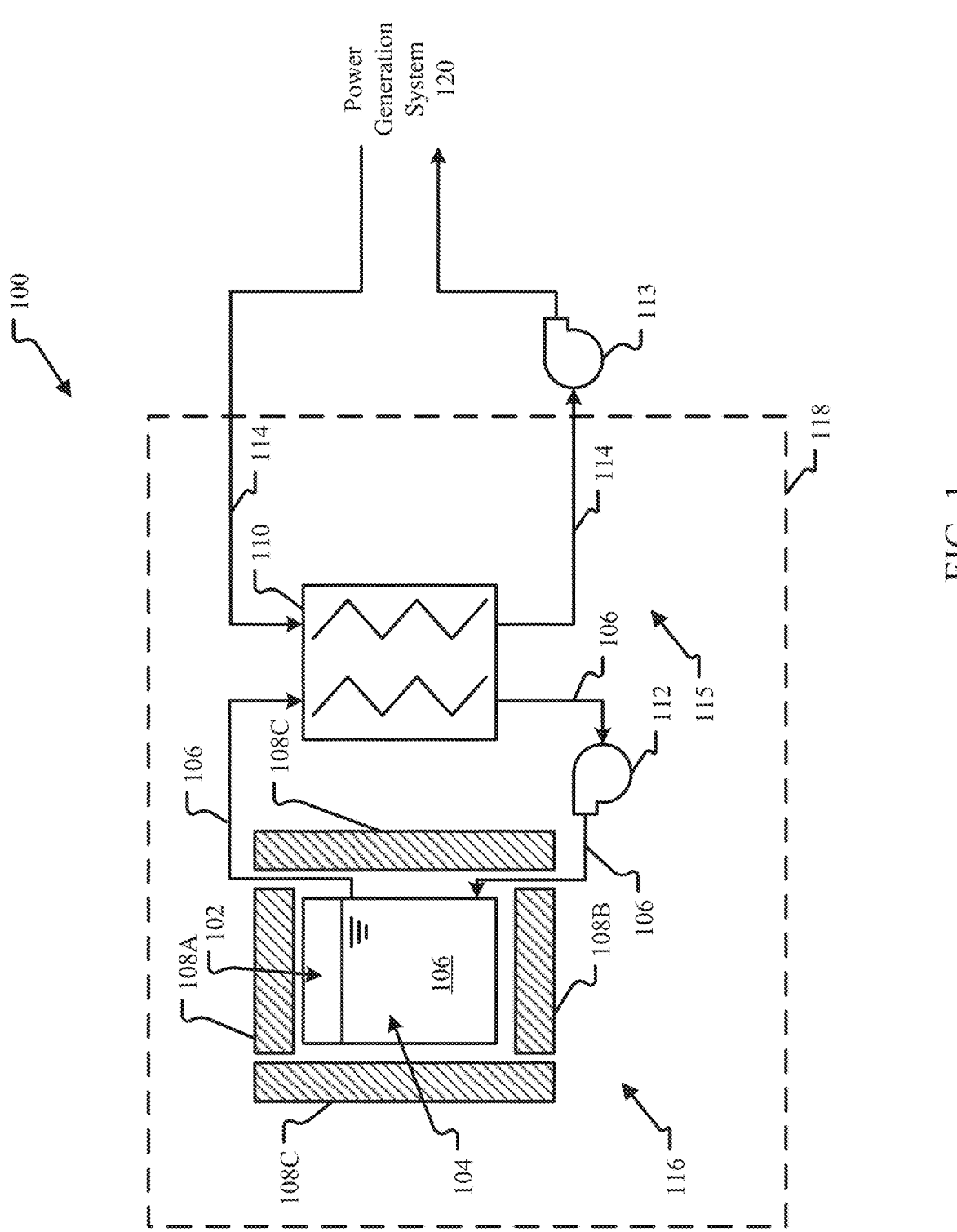
FIG. 1 illustrates, in a block diagram form, some of the basic components of a molten fuel reactor.

FIG. 1 illustrates, in a block diagram form, some of the basic components of a molten fuel reactor. In general, a molten fuel reactor 100 includes a reactor core 104 containing a fissionable fuel salt 106 that is liquid at the operating temperature. Fissionable fuel salts include salts of any nuclide capable of undergoing fission when exposed to low-energy thermal neutrons or high-energy neutrons. Furthermore, for the purposes of this disclosure, fissionable material includes any fissile material, any fertile material or combination of fissile and fertile materials. The fuel salt 106 may or may not completely fill the core 104, and the embodiment shown is illustrated with an optional headspace 102 above the level of the fuel salt 106 in the core 104. The size of the reactor core 104 may be selected based on the characteristics and type of the particular fuel salt 106 being used in order to achieve and maintain the fuel in an ongoing state of criticality, during which the heat generated by the ongoing production of neutrons in the fuel causes the temperature of the molten fuel to rise when it is in the reactor core. Criticality refers to a state in which loss rate of neutrons is equal to or less than the production rate of neutrons in the reactor core. The performance of the reactor 100 is improved by providing one or more reflectors 108A, 108B, 108C around the core 104 to reflect neutrons back into the core. Reflectors may be made of any neutron reflecting material, now known or later developed, such as graphite, beryllium, steel, tungsten carbide. The molten fuel salt 106 is circulated between the reactor core 104 and one or more primary heat exchangers 110 located outside of the core 104. The circulation may be driven using one or more pumps 112.

The primary heat exchangers 110 transfer heat from the molten fuel salt 106 to a primary coolant 114 that is circulated through a primary coolant loop 115. In an embodiment the primary coolant may be another salt, such as NaCl—MgCl$_2$, or lead. Other coolants are also possible including Na, NaK, supercritical CO$_2$ and lead bismuth eutectic. In an embodiment, a reflector 108 is between each primary heat exchanger 110 and the reactor core 104 as shown in FIG. 1. For example, in an embodiment a cylindrical reactor core 104, having a diameter of 2 meters (m) and a height of 3 m, is oriented vertically so that the flat ends of the cylinder are on the top and bottom respectively. An entire reactor core 104 is completely encased in reflectors 108 between which are provided channels for the flow of fuel salt 106 into and out of the reactor core 104.

Although FIG. 1 illustrates one heat exchanger 110, depending on the embodiment any number of heat exchangers 110 may be used, the heat exchangers 110 being spaced around the exterior of the core 104. For example, embodiments having two, four, six, eight, ten, twelve and sixteen primary heat exchangers are contemplated.

As discussed above, any design of heat exchanger may be used but, generally, the heat exchangers 110 will be discussed in terms of a shell and tube heat exchanger. In shell and tube heat exchanger embodiments, the fuel salt may flow through the tubes which are contained within a shell filled with the primary coolant. The fuel salt enters the tubes via one or more tube sheets in the shell to prevent the fuel salt from mixing with the primary coolant. This is referred to as either a tube-side fuel or a shell-side coolant configuration. Alternatively, the fuel salt may flow through the shell and the primary coolant may flow through the tubes, which is referred to either as a tube-side coolant or shell-side fuel configuration.

Salt contacting surfaces of heat exchanger components may be clad to protect against corrosion. Other protection options include protective coatings, loose fitting liners or press-fit liners. In an embodiment, cladding on the internal surface of the tubes is molybdenum that is co-extruded with the base heat exchanger tube material. For other fuel salt contacting surfaces (exterior surfaces of the tube sheets and exterior surface of the shell), the cladding material is molybdenum alloy. Nickel and nickel alloys are other possible cladding materials. Molybdenum-rhenium alloys may be used where welding is required. Components in contact with primary cooling salt may be clad with Alloy 200 or any other compatible metals, such as materials meeting the American Society of Mechanical Engineers' pressure vessel code. The tube primary material may be 316 stainless steel or any other compatible metals. For example, in an embodiment alloy 617 is the shell and tube sheet material.

In a tube-side fuel embodiment the fuel salt flows through the tubes of the heat exchanger 110 and exits into the fuel salt outlet channel. The primary coolant within the shell of the heat exchanger 110 removes heat from the fuel salt traveling through the tubes and heated coolant is then passed to the power generation system 120.

As shown in FIG. 1, heated primary coolant 114 from the primary heat exchangers 110 is passed to a power generation system 120 for the generation of some form of power, e.g., thermal, electrical, or mechanical. The reactor core 104, primary heat exchangers 110, pumps 112, molten fuel circulation piping (including other ancillary components that are not shown such as check valves, shutoff valves, flanges, drain tanks, etc.) and any other components through which the molten fuel circulates or contacts during operation can be referred to as the fuel loop 116. Likewise, the primary coolant loop 115 includes those components through which primary coolant circulates, including the primary heat exchangers 110, primary coolant circulation piping (including other ancillary components that are not shown such as coolant pumps 113, check valves, shutoff valves, flanges, drain tanks, etc.).

The molten fuel reactor 100 further includes at least one containment vessel 118 that contains the fuel loop 116 to prevent a release of molten fuel salt 106 in case there is a leak from one of the fuel loop components. Note that not all of the primary coolant loop 115 is within the containment vessel 118.

In an embodiment fuel salt flow is driven by a pump 112 so that the fuel salt circulates through the fuel loop 116. In the embodiment shown, there is one pump 112 for each primary heat exchanger 110. Fewer or more pumps may be used. For example, in alternative embodiments multiple, smaller pumps may be used for each heat exchanger 110. In an embodiment, a pump 112 may include an impeller at some location within the fuel loop 116 that when rotated drives the flow of fuel salt around the fuel loop. The impeller may be attached to a rotating shaft that connects the impeller to a motor which may be located outside of the containment vessel. An example of this embodiment can be found in FIGS. 6A-6C, discussed below. Other pump configurations are also possible.

Broadly speaking, this disclosure describes multiple alterations and component configurations that improve the performance of the reactor 100 described with reference to FIG. 1.

Frustoconical Reactor Core Configuration

In typical fuel salts, higher temperature molten salt is less dense than lower temperature salt. For example, in one fuel salt (71 mol % UCl$_4$—17 mol % UCl$_3$—12 mol % NaCl) for a 300° C. temperature rise (e.g., 627° C. to 927° C.), the fuel salt density was calculated to fall by 18%, from 3660 to 3010 kg/m$^3$. In an embodiment, it is desirable that the reactor core and primary heat exchanger be configured such that fuel circulation through the fuel loop can be driven by the density differential created by the temperature difference between the higher temperature salt in the core and the lower temperature salt elsewhere in the fuel loop 116. This circulation may be referred to as natural circulation as the circulation flow occurs naturally as a result of the density differences in the fuel salt during steady state operation.

Figure 2A:
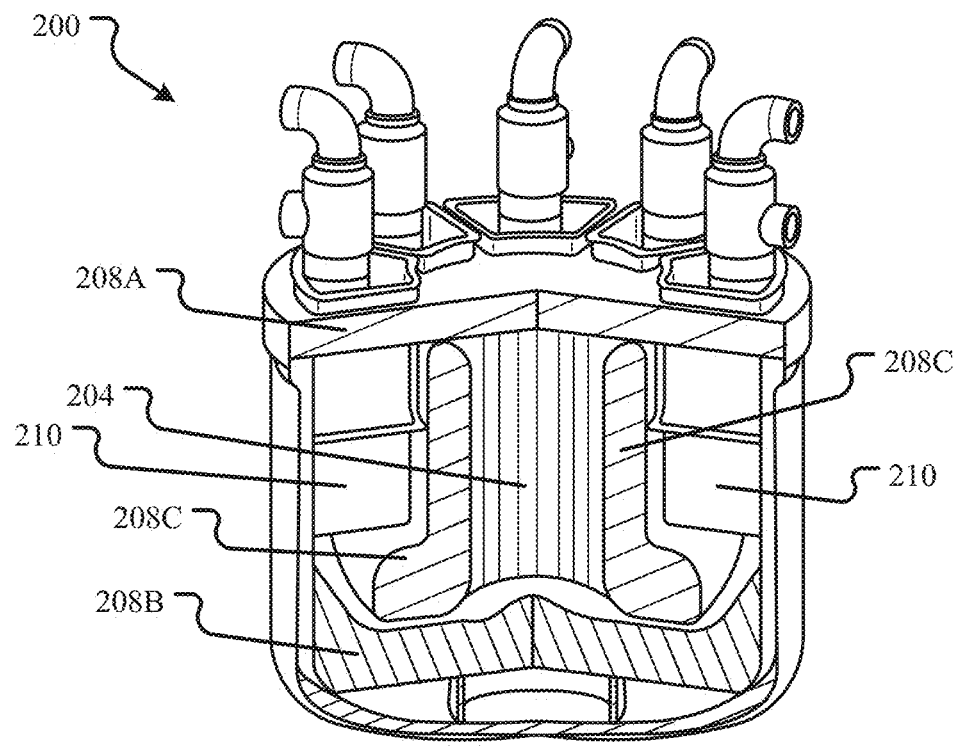
FIGS. 2A-2C illustrate different views of an embodiment of a reactor that uses only natural circulation to circulate fuel salt around the fuel loop.
Figures 2B, 2C:
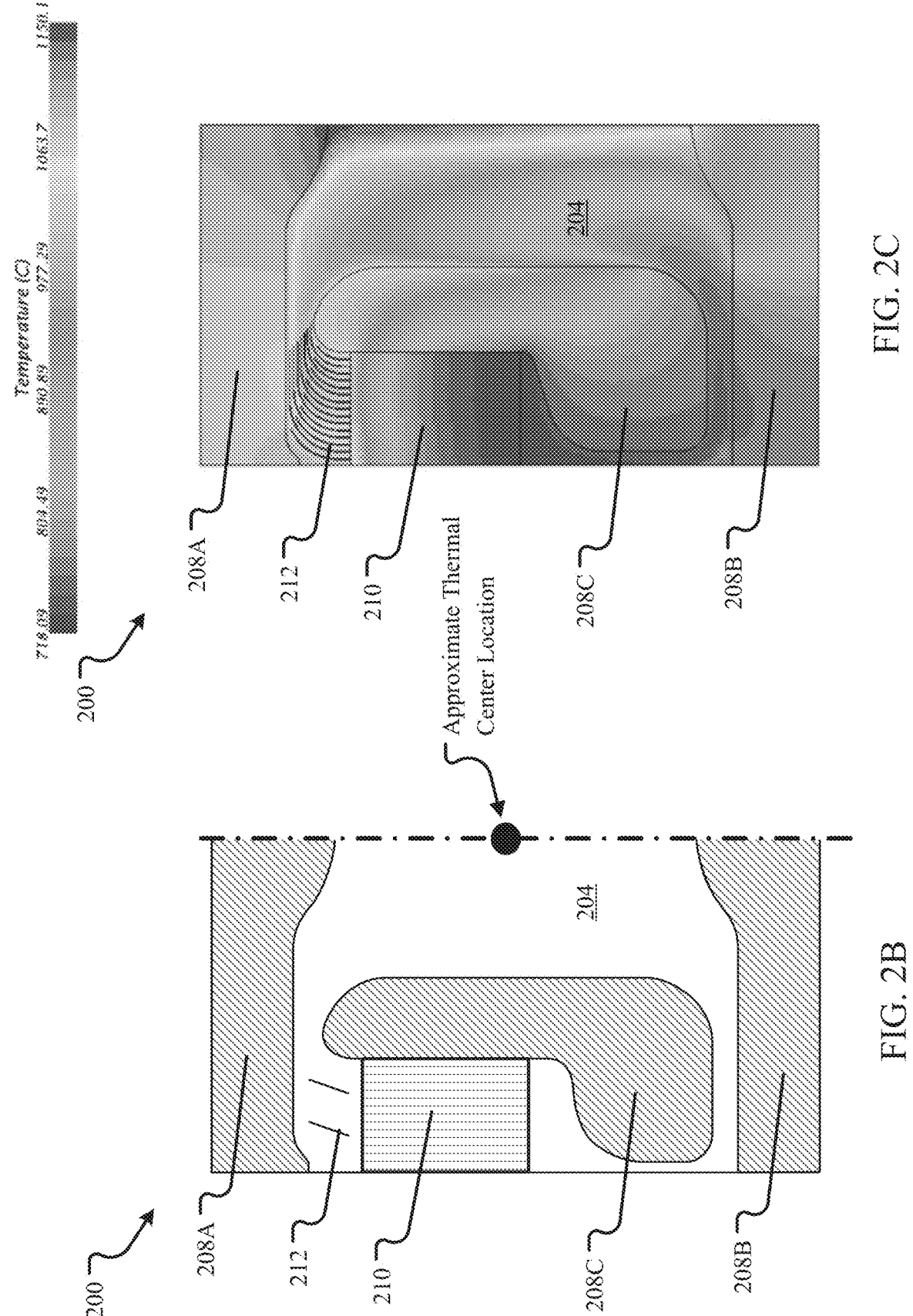

FIGS. 2A-2C illustrate an embodiment of a reactor that uses only natural circulation to circulate fuel salt around the fuel loop. This configuration can obviate the need for fuel salt pumps and no pumps are shown. This reduces the complexity of the reactor 200, however, relying solely on natural circulation may limit the amount of heat that can be removed and, thus, limit the total power output of the reactor 200.

FIG. 2A illustrates a reactor 200 that includes a roughly cylindrical reactor core 204, which is a volume defined by, a upper reflector 208A at the top, a lower reflector 208B at the bottom, and a lateral or inner reflector 208C that rings the circumference of the core. As with FIG. 1, flow paths are provided at the top and the bottom of the reactor core 204 to allow the fuel salt to flow around the lateral reflector 208C. In this natural circulation embodiment, heated fuel salt flows over the top the lateral reflector 208C to the heat exchanger(s) 210 during steady state fission. The fuel salt then circulates downward through the heat exchanger(s) 210 and cooled fuel salt returns to the reactor core 204 via one or more flow paths between the bottom reflector 208B and the lateral reflector 208C. In the embodiment shown, the lateral reflector 208B is provided with a flow guide shaped as a bulge below the heat exchanger 210 that constricts the cooled fuel salt flow path back into the reactor core 204. Any type of flow guide shape may be used.

FIG. 2B is a cross-sectional view of half of the reactor of FIG. 2A showing the flow paths for the fuel salt. In the embodiment shown, for modeling purposes the reactor core 204 is 1 meter (m) in radius with a height of 3 m. Solid upper and lower bottom reflectors 208A, 208B define the upper and lower extents of the fuel salt. The spaces between the reflectors create flow paths, which may alternately be referred to as channels or ducts, allowing the circulation of fuel salt from the reactor core over the inner reflector, through the primary heat exchanger, under the inner reflector, and back into the bottom of the reactor core. One or more flow directing baffles or guide vanes may be provided in the fuel salt ducts of the fuel loop in order to obtain a more uniform flow and equally distribute the flow of fuel salt through the fuel loop and to reduce stagnant zones in the fuel loop.

Fuel salt heated in the core will buoyantly rise and flow around the inner reflector 208C, through the heat exchanger 210, then through the return channel defined by the bulging shape of the inner reflector 208C and the lower reflector 208B. In an embodiment, the reflectors may be lead filled vessels and the guide structures (e.g., vanes 212) are solids with thermal properties of stainless steel. The contouring and guide structures illustrated are provided to promote good flow at the inlet of the heat exchanger and reduce the occurrence and impact of recirculation cells within the fuel loop.

FIG. 2C illustrates temperature and flow modelling results for the embodiment shown in FIG. 2B under a set of representative operating conditions for a representative fuel salt (71 mol % $UCl_4$—17 mol % $UCl_3$—12 mol % NaCl). From the modeling, it was found that the highest temperature was approximately 1150° C. at the top of the center of the core 204 and the lowest temperature was about 720° C. at the outlet of the heat exchanger 210. The temperature results indicate that, under the conditions of the model, a natural circulation cell is created in which the dense, cool fuel salt flows into the bottom of the reactor core 204 thereby displacing the lighter, hot fuel salt into the heat exchanger 210. The ongoing fission in the center of the core 204 reheats the cooled fuel salt and drives the circulation cell until the fission is interrupted, for example by the introduction of a moderator or degradation of the fuel salt.

In an alternative embodiment a reactor may use both pumps and natural circulation to move the fuel salt through the fuel loop during normal power-generating operation. Natural circulation is still beneficial, in such an embodiment, both in reducing the size of the pumps needed to achieve a target flow rate and in the event of a loss of power to the pump or pumps because the circulation, and thus the cooling, will continue even without the active pumping fuel salt through the fuel loop.

One method of increasing the strength of natural circulation is through selectively locating the high temperature reactor core 204 below the primary heat exchanger 210. This enhances the effect of the density differential on the circulation by locating the densest salt, e.g., the cooled salt output by the primary heat exchanger, at a location in the fuel loop 116 physically above the highest temperature (thus least dense) salt, which can be found at the "thermal center" of the reactor core.

For the purposes of this disclosure, the "thermal center" refers to that location within the reactor core, based on the shape and size of the core, where the most heat is generated by the ongoing nuclear fission reactions in the reactor core, in the absence of flow through the reactor. This point is identified in FIG. 2B, located at the center of the cylindrical reactor core, both vertically and horizontally. In a subcritical homogenous fuel salt, the location of the thermal center due to decay heat can be approximated by using the center of mass of the fuel salt volume defined by the reactor core 204. This is just an approximation, however, as the configuration and shape of the reflectors 208 and other components will have some impact on the fission reaction within the reactor core 204, and thus the location of the thermal center.

In its most simple embodiment (not shown), a reactor designed to use natural circulation can locate the primary heat exchanger completely above the reactor core. However, this vertically stacked design is complicated by the generation of gases in the fuel salt during nuclear fission as well as potentially requiring a larger containment vessel. The evolution of gases into the heat exchanger increases the chance of vapor lock of the exchanger and generally increases the complexity and reduces the efficiency of the heat exchanger. For that reason, reactors with heat exchangers at or below the typical working surface level of the salt in the reactor core have certain benefits.

Figure 3:
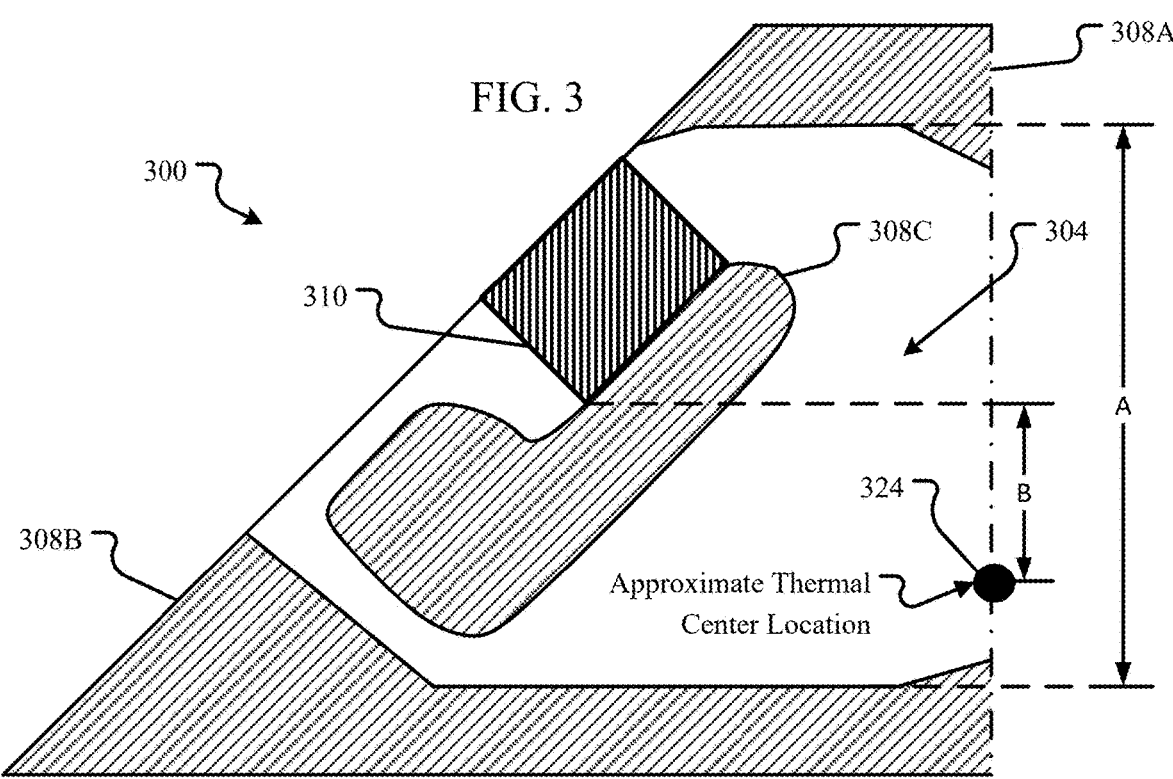
FIG. 3 illustrates an embodiment of an improved configuration for a naturally circulating fission reactor core in which the reactor core is larger at the bottom than at the top.

FIG. 3 illustrates an embodiment of an improved configuration for a naturally circulating fission reactor core in which the reactor core is larger at the bottom than at the top. In the embodiment shown, the reactor core 304 has a roughly frustoconical shape. Frustoconical refers to the shape of a cone with the tip truncated by a plane parallel to the cone's base. FIG. 3 is a cross sectional view of half of the reactor core 300 similar to that of FIGS. 2A-2C. The reactor core 304 is surrounded by an upper reflector 308A, a lower reflector 308B and an inner reflector 308C that separates the reactor core from the primary heat exchanger 310. As with the reactor in FIG. 2B, there is no headspace and the entire reactor, i.e., reactor core 304, channels, and primary heat exchanger 310 is filled with fuel salt. The spaces between the reflectors 308A, 308B, 308C create channels allowing the circulation of fuel salt from the reactor core 304 over the inner reflector 308C, through the primary heat exchanger 310, under the inner reflector 308C, and back into the bottom of the reactor core 304. The frustoconical shape has the effect of moving the center of mass and, thus, the thermal center 324 of the fuel salt lower in the reactor core 304 and requires that the thermal center be below midpoint between the top and the bottom of the reactor core. Given a fixed location of the primary heat exchangers relative to the reactor core, this change to a shape in which the bottom of the reactor core is larger than the top, as occurs in a frustum of a cone or pyramid, will improve the natural circulation of the fuel salt in the fuel loop.

Figure 4:
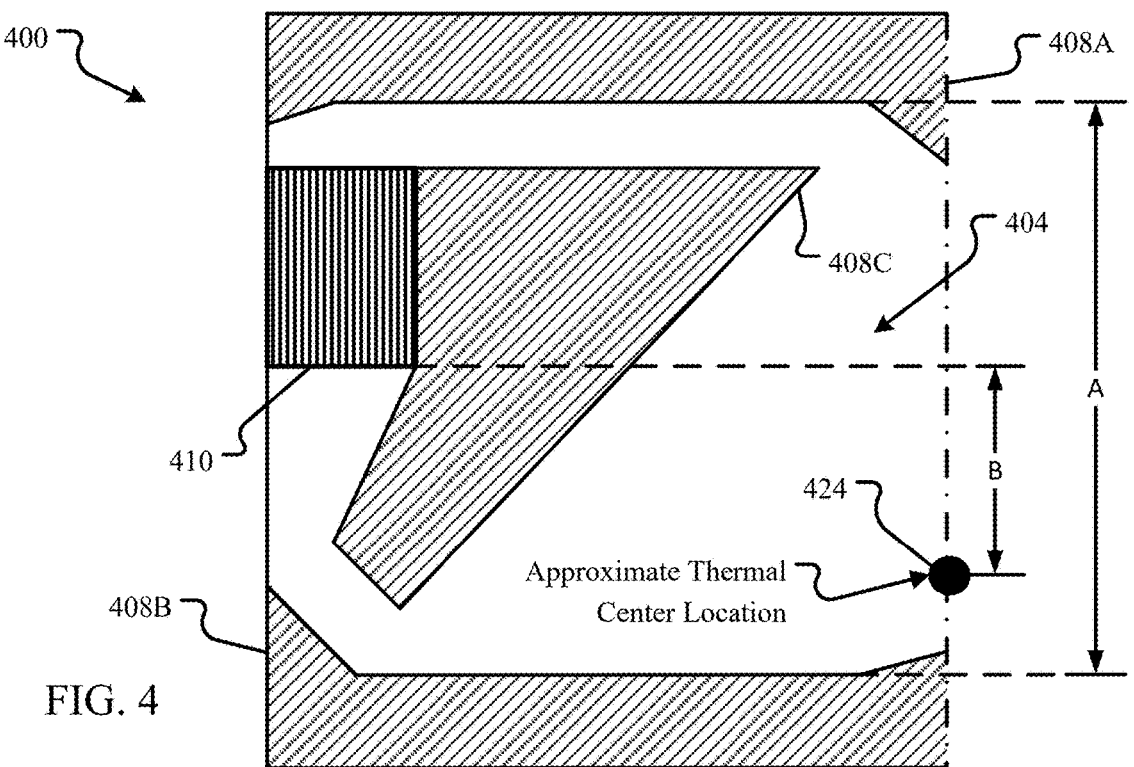
FIG. 4 illustrates another embodiment of a frustoconical reactor core design.

FIG. 4 illustrates another embodiment of a frustoconical reactor core design. FIG. 4 is a cross sectional view of half of the reactor core 400 similar to that of FIGS. 2A-2C and 3. The reactor core 404 is surrounded by an upper reflector 408A, a lower reflector 408B and an inner reflector 408C that separate the reactor core from a vertically-oriented primary heat exchanger 410. The spaces between the reflectors 408A, 408B, 408C create channels allowing the circulation of fuel salt from the reactor core 404 over the inner reflector 408C, through the primary heat exchanger 410, under the inner reflector 408C, and back into the bottom of the reactor core 404. Again, the frustoconical shape has the effect of moving the center of mass and the thermal center 424 of the fuel salt lower in the reactor core.

FIGS. 2A-2C, 3 and 4 are drawn roughly to the same scale and a comparison of the three illustrates the difference in approximate locations of their respective thermal centers. In FIG. 2B, the thermal center is approximately at the center of the reactor core which is almost level to the bottom of the primary heat exchanger. In FIGS. 3 and 4, the thermal centers are located significantly lower in the reactor core and clearly below the bottom of the primary heat exchanger. By bottom of the heat exchanger, it is meant the location where the coldest molten salt will be in the system, which is the outlet of the heat exchanger. For example, in a shell-and-tube heat exchanger, the bottom of the heat exchanger will be at the lower tube sheet.

By using a reactor core that is larger at the bottom than at the top as shown in FIGS. 3 and 4, for any given heat exchanger configuration in which the top of the heat exchanger is level with or below the fuel salt level in the reactor core, the location of the thermal center relative to the location of the coldest fuel salt in the circulation loop can be altered. This further allows the amount of natural circulation to be controlled. In an embodiment, one performance factor that determines the strength of the natural circulation in a reactor is the ratio of the vertical distance, A, between the top and bottom of the reactor core, that is the depth of salt in the reactor core, (identified as distance A in FIGS. 3 and 4) and the distance below the bottom of the heat exchanger of the thermal center of the reactor core (identified as distance B in FIGS. 3 and 4). In an embodiment, the ratio of B/A is positive, that is the thermal center is below the bottom of the heat exchanger. The larger the ratio of B/A is, the stronger the natural circulation cell will be. In an embodiment, the ratio of B/A is between 0.01 and 0.45. In yet another embodiment, the ratio is between 0.1 and 0.4.

Reactor cores shaped as the frustum of a cone are but one example of a reactor core shape that is larger at the bottom than the top and that, therefore, enhances the natural circulation through a primary heat exchanger. Other shapes are possible, especially since the shape of the reactor core is essentially defined by the upper, lower and internal reflectors. For example, the frustum need not be exactly conical, but could be a frustum of a pyramid having any number of planar or curved sides, e.g., a 3-sided pyramid, a 4-sided (or square) pyramid, a 5-sided (or pentagonal) pyramid, a 6-sided (or hexagonal) pyramid, and so on up to any number sides of a pyramid, each having a truncated tip.

Figure 5:
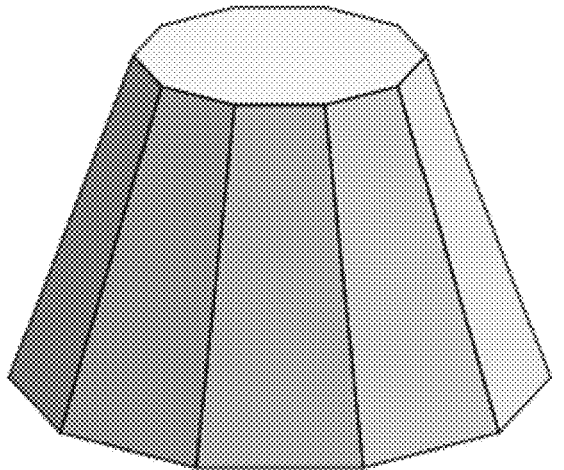
FIG. 5 illustrates a frustum of a decagonal pyramid (10-sided pyramid) reactor core suitable for a naturally circulating reactor core.

FIG. 5, for example, illustrates a frustum of a decagonal pyramid (10-sided pyramid), which would be a suitable shape for a naturally circulating reactor core. In addition, the shape need not be axially symmetrical. That is, a reactor core could be shaped as a trapezoidal prism having a base, a top, one set of parallel vertical sides and an opposing set of sloping planar sides. In yet another alternative some of the prism's sides could be curved instead of planar. The reactor core also could be shaped as a hyperboloid, as with the commonly observed cooling towers at some nuclear facilities, or irregularly shaped. Any such frustum shape is suitable as long as the area of the base of the reactor core is larger than the area of the top or the majority of the mass of the fuel salt is below the midpoint between the top and bottom of the reactor core so that the thermal center is lower than the midpoint between the level of fuel salt in the reactor core and the bottom of the reactor core. In combination with a heat exchanger having an inlet at or below the level of fuel salt in the reactor core and an outlet above the thermal center, the frustum-shaped reactor core significantly improves the natural circulation of the fuel salt during power-generating operation over a cylinder-shaped core of the same height.

Integrated Active Vessel Cooling

Figure 6A:
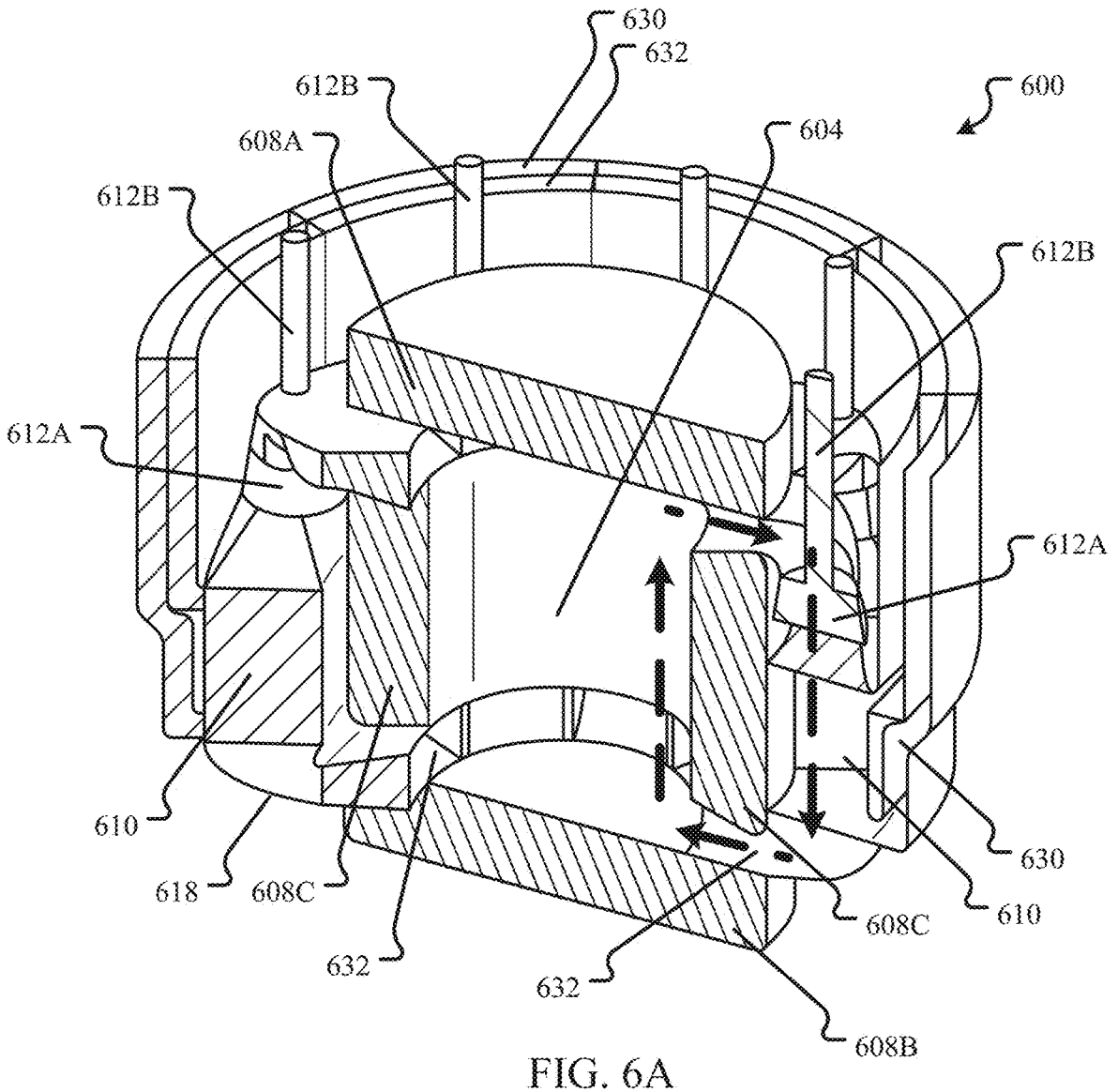
FIGS. 6A-6C illustrate an embodiment of a reactor design that integrates active cooling of the containment vessel into the primary coolant loop.
Figure 6B:
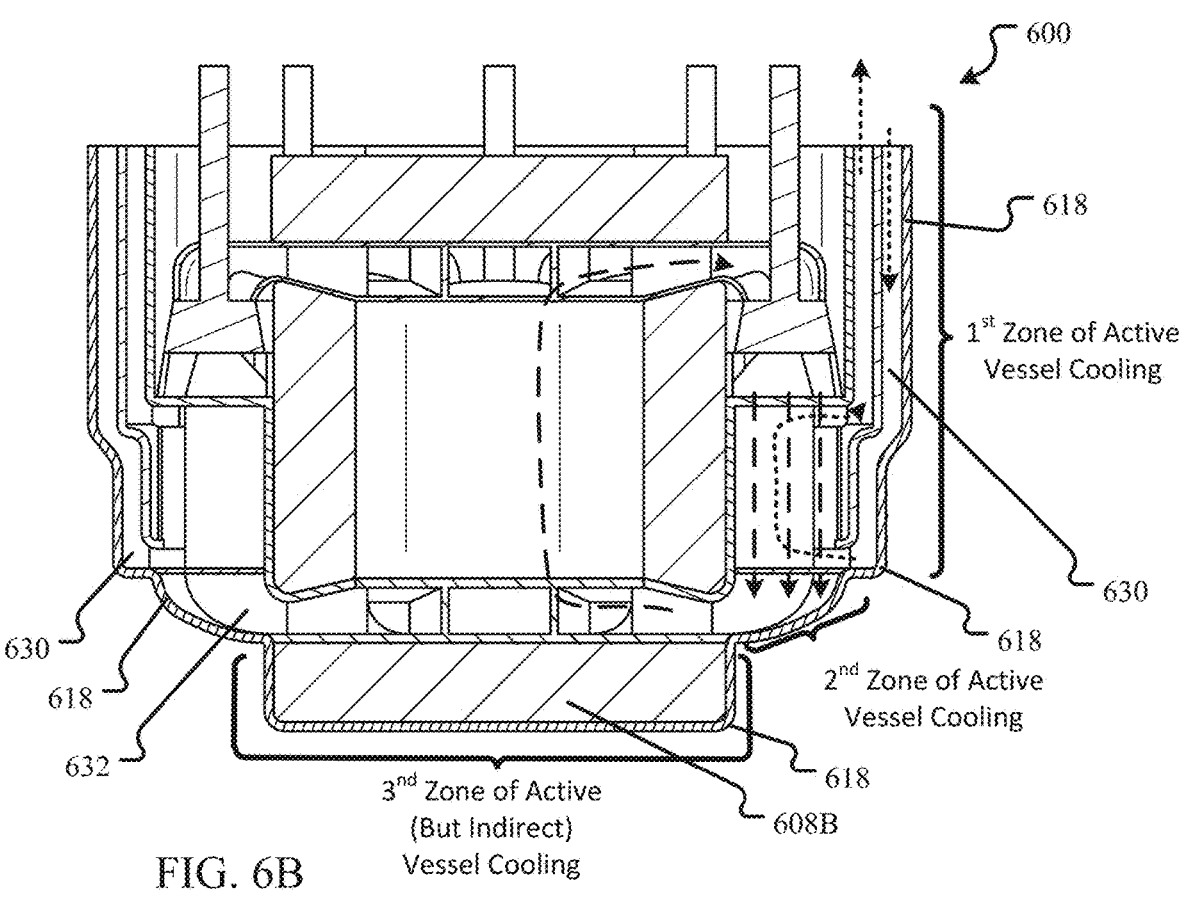
Figure 6C:
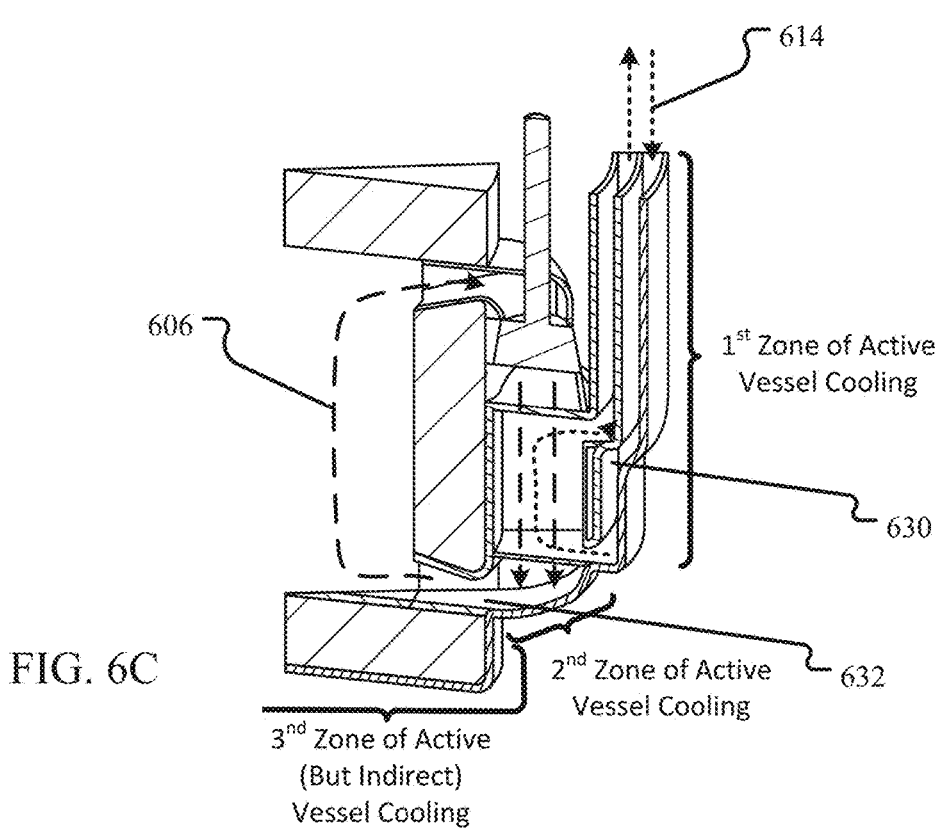

FIGS. 6A-6C illustrate an embodiment of a reactor design that integrates active cooling of the containment vessel into the primary coolant loop. FIG. 6A illustrates a perspective view of an eight-exchanger configuration of a molten salt reactor 600 partially cutaway to show different internal components. FIG. 6B is a cross-sectional view through the center of the reactor and two opposing heat exchangers. FIG. 6C is a cross-sectional view in perspective showing more detail about the heat exchanger design and the routing of primary coolant. In the FIGS. 6B and 6C, brackets are provided to show the sections of the containment vessel 618 that are subjected to active cooling due to coolant or fuel salt flow.

In the embodiment shown, the reactor core 604 and heat exchangers 610 are within a containment vessel 618. The primary containment vessel 618 is defined by a liner or set of liners that create an open-topped vessel. The cooled primary coolant enters and exits the vessel 618 from the top, which allows the containment vessel to be unitary and have no penetrations. The primary coolant loop is integrated into the reactor 600 so that the entering primary coolant first cools at least a portion of the containment vessel 618. After being routed next to an interior surface of the containment vessel 618 for some distance in a primary coolant inlet channel 630, in the embodiment shown the coolant is then routed into the bottom of the primary heat exchanger 610. The coolant exits the top of the primary heat exchanger 610 and is then routed out of the containment vessel 618 and to a power generation system (not shown).

In the embodiment shown fuel salt is driven through the fuel loop eight separate impellers 612A located above the heat exchangers 610. Each impeller 612A is connected by a rotating shaft 612B to a motor (not shown) located above the reactor 600. The flow of the salt through the fuel loop is shown by dashed line 606 while flow of the primary coolant is shown by dotted line 614.

Another aspect of the illustrated design is that the cooled fuel salt exiting the heat exchangers 610 is routed along a portion of the containment vessel prior to entering the reactor core 604. This integrates additional active cooling into the containment vessel. As the embodiment illustrates, the containment vessel is not immediately adjacent to the reactor core at any point. In fact, the containment vessel 618 of FIGS. 6A-6C is immediately adjacent to only three components: the inlet channel 630 for cooled primary coolant, the cooled fuel salt channel 632 that returns cooled salt to the reactor core 604, and the lower reflector 608B. Note also that the lower reflector 608B itself is cooled by the flow of cooled fuel salt entering the reactor core 604, which then indirectly cools the portion of the containment vessel 618 adjacent to the lower reflector. Thus, the containment vessel

618 is only adjacent to components that have been actively cooled by contact with either the cooled primary coolant or the cooled fuel salt.

In operation, the primary coolant loop not only serves to remove heat from the molten fuel salt, but also directly removes heat from, and maintains the temperature of, the containment vessel. Note that the system as illustrated allows for independent control of both the fuel temperature and containment vessel temperature through the independent control of the flow of fuel salt and of the primary coolant. By modulating the two flows, the operator may be able to selectively maintain both the core temperature and the containment vessel temperature at independent levels. In addition, by routing the flows and providing insulation at various locations, the heat transfer characteristics between different components may be tailored to provide more or less cooling as needed.

Figure 7:
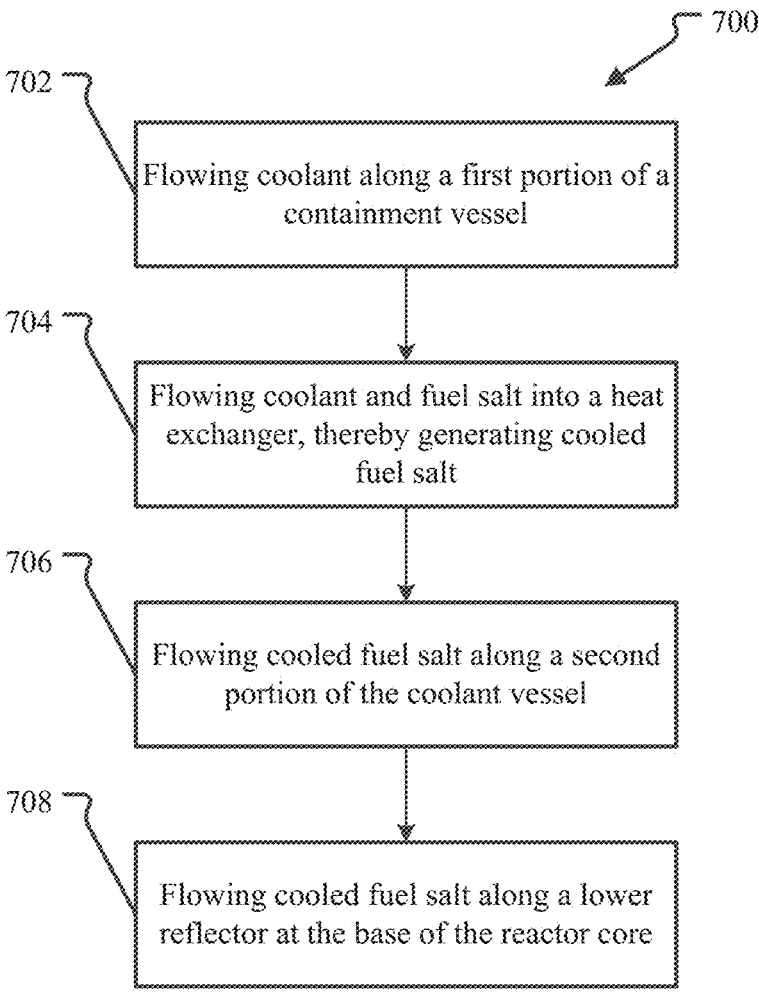
FIG. 7 is a flow diagram of an embodiment of a method for active vessel cooling.

FIG. 7 is a flow diagram of an embodiment of a method for active vessel cooling. In the embodiment shown, integrated active cooling may be considered as a method 700 for actively cooling a containment vessel in a molten fuel salt nuclear reactor by removing heat directly from both the molten salt and at least a portion of the containment vessel via a primary coolant loop. In a first direct containment vessel cooling operation 702, at least a first portion of the containment vessel is cooled by the primary coolant, before the coolant enters the fuel salt heat exchanger proper. This is achieved by routing cooled primary coolant adjacent to an inside surface of at least a portion of the containment vessel prior to routing it into a primary heat exchanger. This serves to actively cool that portion of the containment vessel. In an embodiment, the coolant inlet channel and its thermal contact to the containment vessel in this portion may be designed to enhance the heat transfer between the coolant and the vessel.

The first direct containment vessel cooling operation 702 may also include cooling the reactor head by routing the primary coolant through the reactor head. In an embodiment, this routing may be used to specifically cool the upper reflector of the reactor. This may be done using the same coolant that then flows to the heat exchanger, a side stream of coolant that is then combined with the main coolant stream, or using a completely separate coolant stream.

In the embodiment shown, in a second direct containment vessel cooling operation 704 at least a second portion of the containment vessel is cooled by the cooled fuel salt exiting the primary heat exchanger before the cooled fuel salt enters the reactor core. This may be achieved by routing the cooled fuel salt adjacent to an interior surface of the second portion of the containment vessel as shown in FIGS. 6A-6C. Similar to the coolant inlet channel, the cooled fuel salt channel and its thermal contact to the containment vessel in this portion may be designed to enhance the heat transfer between the cooled fuel salt and the vessel.

A third indirect cooling operation 706 may be performed, as well. In the third operation the cooled fuel salt may be routed adjacent to a surface of a neutron reflector that is in contact with some third portion of the containment vessel, thereby cooling the neutron reflector and, indirectly, the third portion of the containment vessel in contact with the neutron reflector. In this operation 706, depending on the embodiment, the reflector may be a lower reflector such as reflector 608B as shown in FIGS. 6A-6C, or a lateral reflector that is adjacent to a portion of the containment vessel.

Shell-Side Fuel Configuration of Primary Heat Exchanger

Where described in any detail above, primary heat exchangers have been discussed in terms of shell and tube heat exchangers with the fuel salt flowing through the tubes and primary coolant flowing through the shell and around the tubes. As mentioned, this may be referred to as a "tube-side fuel" or "shell-side coolant" configuration, alternatively. However, an improvement in the overall operation of the reactor may be obtained by moving to a shell-side fuel configuration.

It has been determined that in an environment where metal components are exposed to high doses of radiation over long periods of time, it is more difficult to predict the degradation of welded components than of the unwelded material. Welds are weak and potentially subject to radiation damage and degradation over time at high doses. Thus, to reduce risk and increase the level of predictability inherent in a particular design, it is helpful to move welded components as far away as possible from the high neutron flux regions or eliminate welded components from the design altogether.

One welded component that is difficult to eliminate are tube sheets in shell and tube heat exchangers. As the welds in the tube sheets prevent the mixing of the fuel salt with the primary coolant, the reduction of degradation of the welds over time is a design factor.

An improvement in the reactor design is to switch the heat exchanger design to a shell-side fuel design and move the opposing tube sheets as far from the center of the reactor core as possible while remaining within the containment vessel. This reduces the relative dose received by the tube sheets in comparison to the designs in FIGS. 2A-2C, 3, 4, and 6A-6C.

Figure 8:
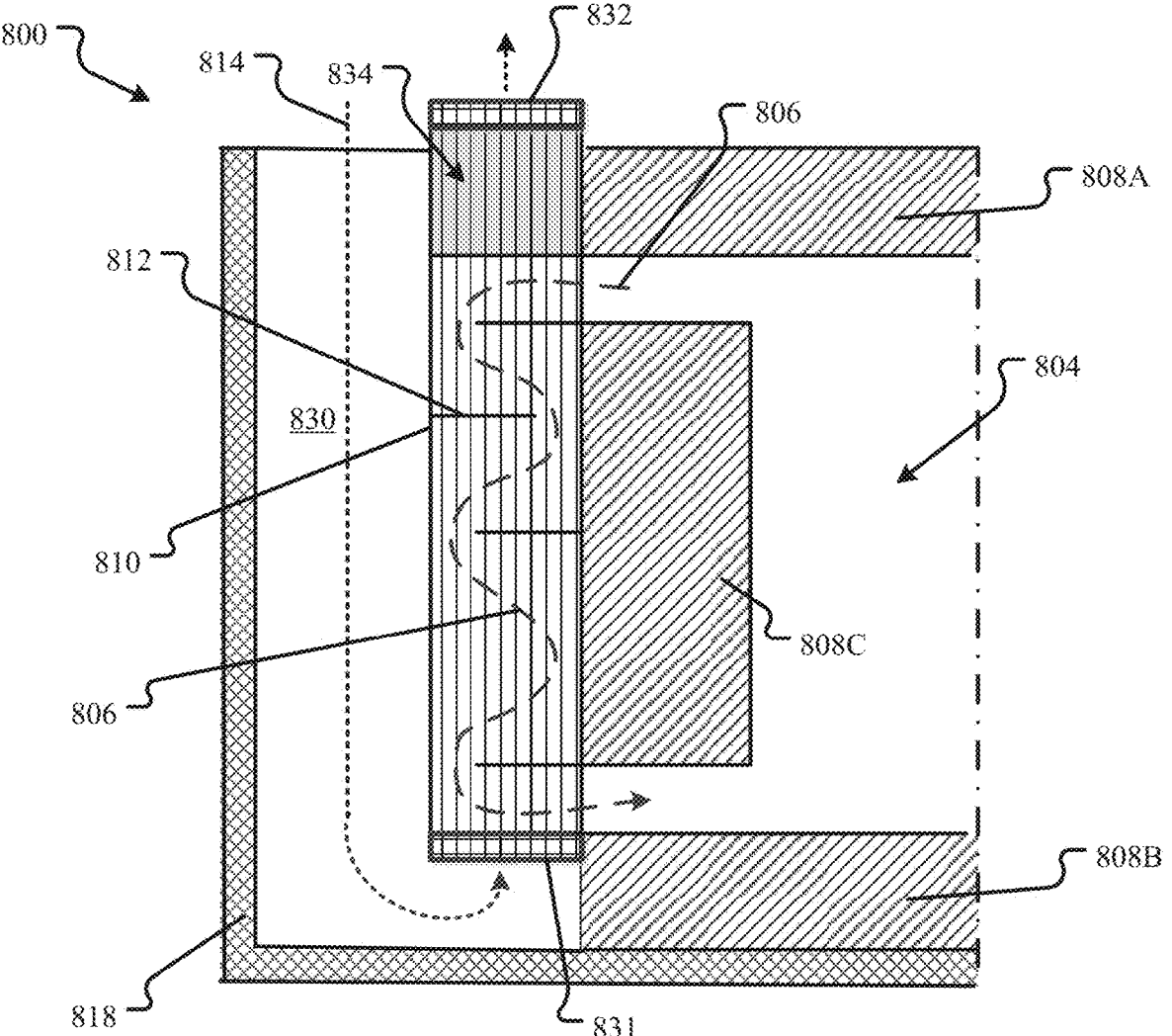
FIG. 8 illustrates an embodiment of a reactor with a shell-side fuel heat exchanger configuration.

FIG. 8 illustrates an embodiment of a reactor with a shell-side fuel heat exchanger configuration. In the embodiment, half of the reactor 800 is illustrated as in FIGS. 4A-6. The reactor core 804 is surrounded by an upper reflector 808A, a lower reflector 808B and an inner reflector 808C that separates the reactor core from the primary heat exchanger 810. The spaces between the reflectors 808A, 808B, 808C create channels allowing the circulation of fuel salt (illustrated by a dashed line 806) from the reactor core 804 over the inner reflector 808C, through the shell side of the primary heat exchanger 810, under the inner reflector 808C, and back into the bottom of the reactor core 804. Baffles 812 are provided in the shell to force the fuel salt to follow a circuitous path around the tubes of the heat exchanger.

Coolant flows through the tube-side of the heat exchanger 810, but before entering the bottom of the heat exchanger first flows down the length of a coolant inlet channel 830 adjacent to the side wall and a portion of the bottom of the containment vessel 818. Thus, the reactor 800 shown uses an embodiment of the active cooling method 700 described above with reference to FIG. 7 in which a portion of the reactor vessel 818 is directly cooled by the cool primary coolant and the lower reflector 808B is directly cooled by the cool fuel salt returning to the reactor core 804.

The primary coolant enters the tubes of the heat exchanger 810 by flowing through the lower tube sheet 831, which is illustrated as being level with the bottom of the reactor core. The lower tube sheet 831 may be at or below the level of the lower reflector 808B depending on the embodiment. The coolant exits the tubes of the heat exchanger at the upper tube sheet 832, which is located in FIG. 8 some distance above the reactor core 804 and containment vessel 818. The flow of the coolant is also illustrated by a dashed line 814.

FIG. 8 illustrates a region 834 within the shell of the heat exchanger that is above the level of salt in the reactor core 804. This region may either be solid, except for the penetrating tubes, or may be a headspace filled with inert gas.

One or more pumps (not shown) may be provided to assist in the fuel salt circulation, the primary coolant circulation or both. For example, an impeller may be provided in one or both of the heated fuel salt inlet channel at the top of the reactor core 804 or (as discussed in greater detail below) the cooled fuel outlet channels at the bottom of the reactor core 804. Likewise, an impeller may be provided in the coolant inlet channel 830 to assist in control of the primary coolant flow.

Figure 9:
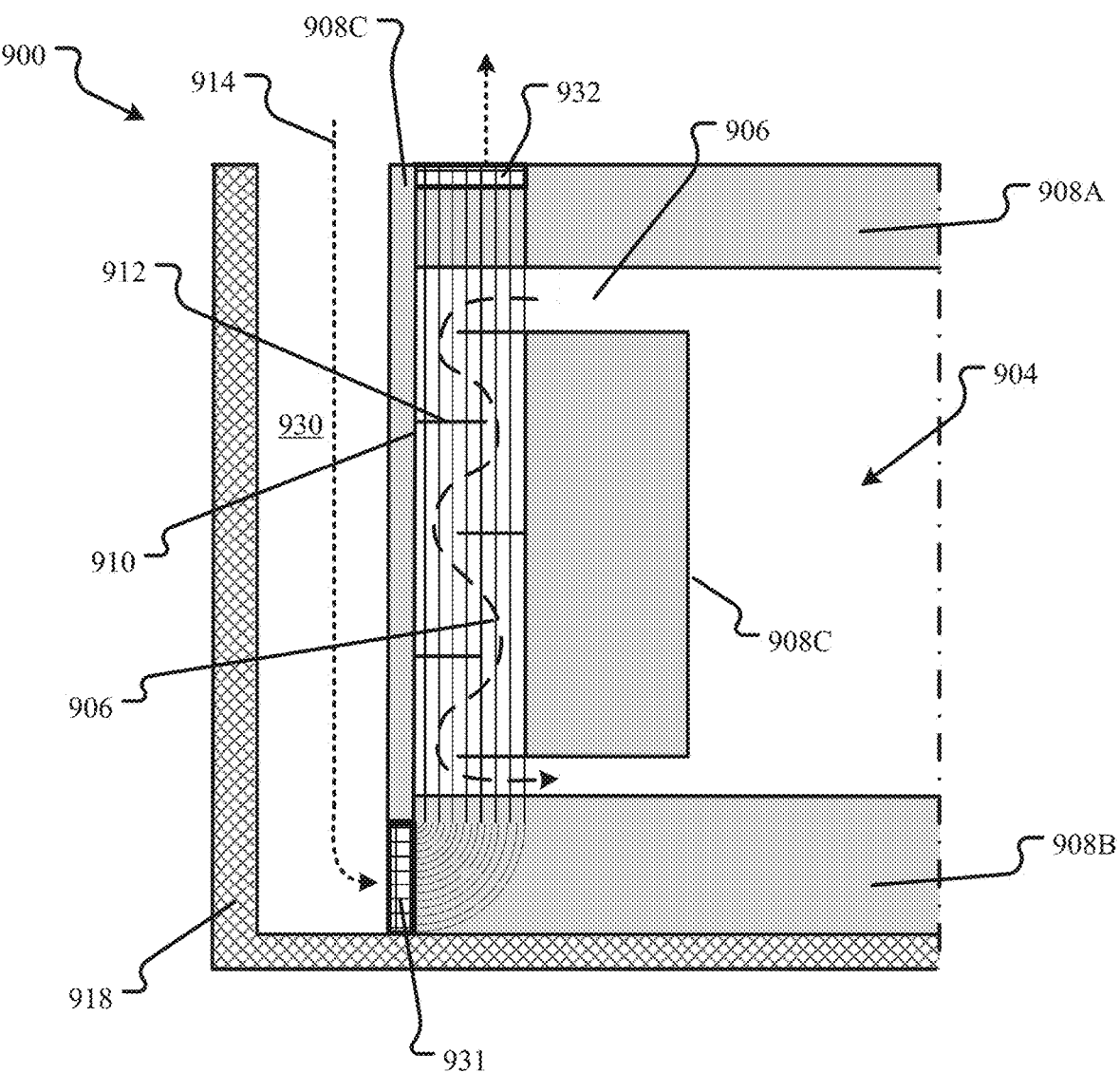
FIG. 9 illustrates an alternative embodiment of the reactor of FIG. 8.

FIG. 9 illustrates an alternative embodiment of the reactor of FIG. 8. In the embodiment shown, the reference numbers correspond to those of FIG. 8 for the same elements. FIG. 9 illustrates an alternative configuration for the tube sheets 931, 932 that reduces, even further, the exposure of the welded tube sheets to neutron flux from the fuel salt. In the embodiment shown, at the tubes of the tube set at least partially penetrate the upper and lower reflectors 908A and 908B at either end of the heat exchanger 910. In yet another embodiment, the tube sheet is eliminated in favor of the reflectors 908A, 908B which then performs the tube sheet's role of preventing fuel salt from shell side leaking into the coolant on the tube side.

Note also that FIG. 9 illustrates a second lateral reflector 908D between the heat exchanger 910 and the coolant inlet channel 930. This can provide additional reflection or can simply be a moderator or other protection to reduce neutron flux outside of the core 904.

U-Tube Configurations of Primary Heat Exchanger

Another improvement in the reactor design is to switch the heat exchanger design to a shell-side fuel design and utilize a U-tube heat exchanger. In this design, the single tube sheet of the U-tube exchanger is located above the reactor core and outside of the containment vessel, and thus in a relatively reduced dose environment in comparison to the designs in FIGS. 2A-2C, 3, 4, and 6A-6C.

Figure 10:
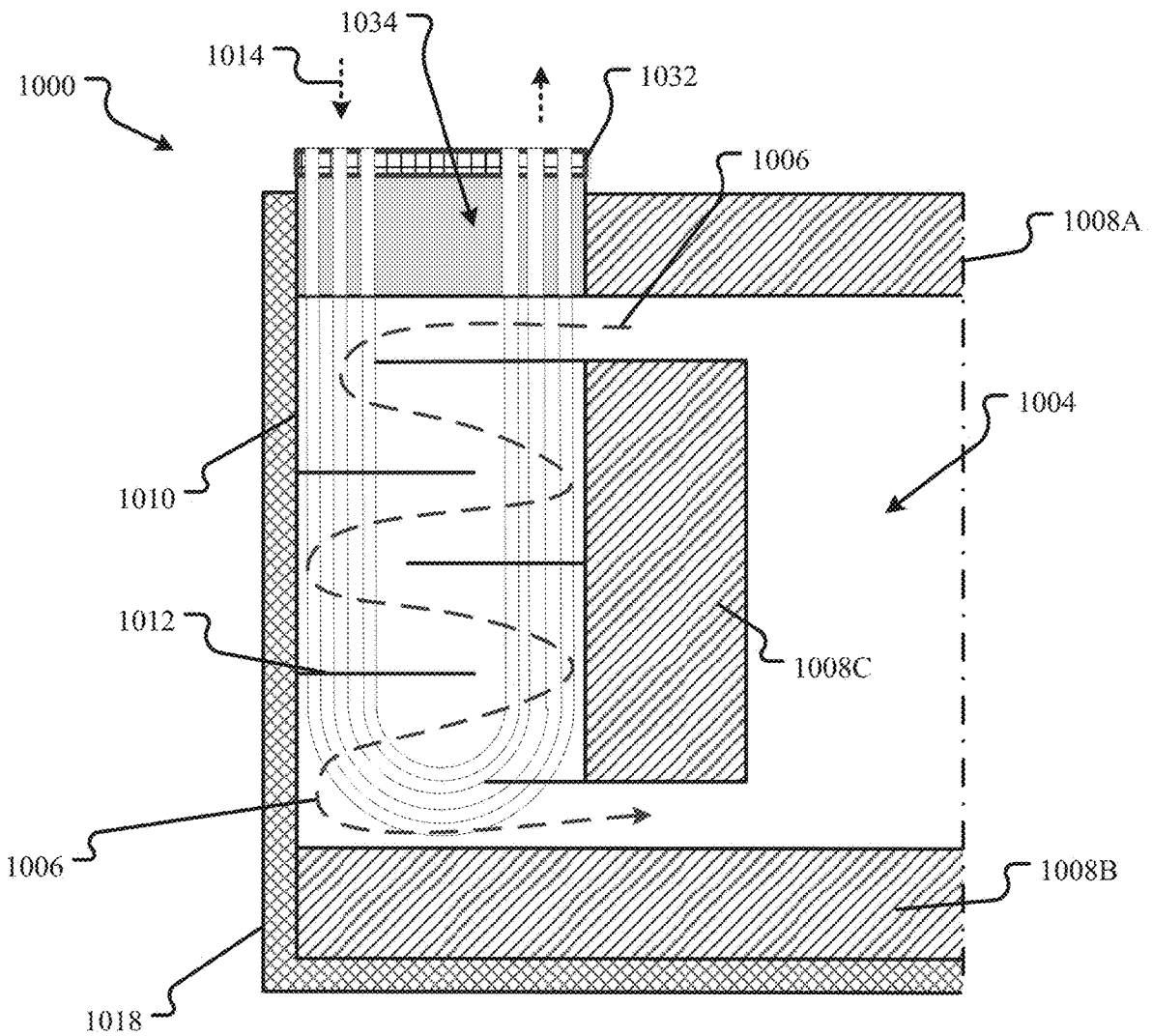
FIG. 10 illustrates an embodiment of a reactor with a shell-side fuel, U-tube heat exchanger configuration in which the single tube sheet is located above the reactor core.

FIG. 10 illustrates an embodiment of a reactor with a shell-side fuel, U-tube heat exchanger configuration in which the single tube sheet is located above the reactor core. In the embodiment, half of the reactor 1000 is illustrated as in FIGS. 8 and 9. The reactor core 1004 is surrounded by an upper reflector 1008A, a lower reflector 1008B, and an inner reflector 1008C that define the reactor core and separate it from the primary heat exchanger 1010. The spaces between the reflectors 1008A, 1008B, 1008C create channels allowing the circulation of fuel salt (illustrated by a dashed line 1006) from the reactor core 1004 over the inner reflector 1008C, through the shell side of the primary heat exchanger 1010, under the inner reflector 1008C, and back into the bottom of the reactor core 1004. Baffles 1012 are provided in the shell to force the fuel salt to follow a circuitous path around the tubes of the heat exchanger. Coolant flows through the U-shaped tubes of the heat exchanger 1010, so that the coolant both enters the tubes and exits the tubes from the top, through the single tube sheet 1032. The upper tube sheet 1032 is located in FIG. 10 some distance above the reactor core 1004 and containment vessel 1018, and thus its exposure to radiation is reduced relative to the other designs as discussed above. The flow of the coolant is also illustrated by a dashed line 1014.

FIG. 10 illustrates a region 1034 within the shell of the heat exchanger that is above the level of salt in the reactor core 1004. Again, this region may either be solid, except for the penetrating tubes, or may be a headspace filled with inert gas. If solid, it may be filled with a reflector material through which the tube set penetrates.

Again, one or more pumps, or at least their impellers, (not shown) may be provided to assist in fuel salt and/or coolant circulation. For example, an impeller may be provided in one or both of the heated fuel salt inlet channel at the top of the reactor core 1004 or the cooled fuel outlet channel at the bottom of the reactor core 1004.

In yet another embodiment, welded components such as tube sheets 1032 may be shielded from neutrons with a sheet of neutron-absorbing material. The neutron-absorbing material may be placed adjacent to the tube sheet on the side facing the reactor core 1004. Such a tube sheet, neutron-absorbing material combination may be used in any embodiment discussed above. The neutron-absorbing material may be a coating, an additional layer, or an independent structural component adjacent to or spaced apart from the tube sheet.

Yet another embodiment of a U-tube heat exchanger design rotates the heat exchanger 90 degrees so that the coolant enters and exits the heat exchanger laterally with reference to the containment vessel.

Figure 11:
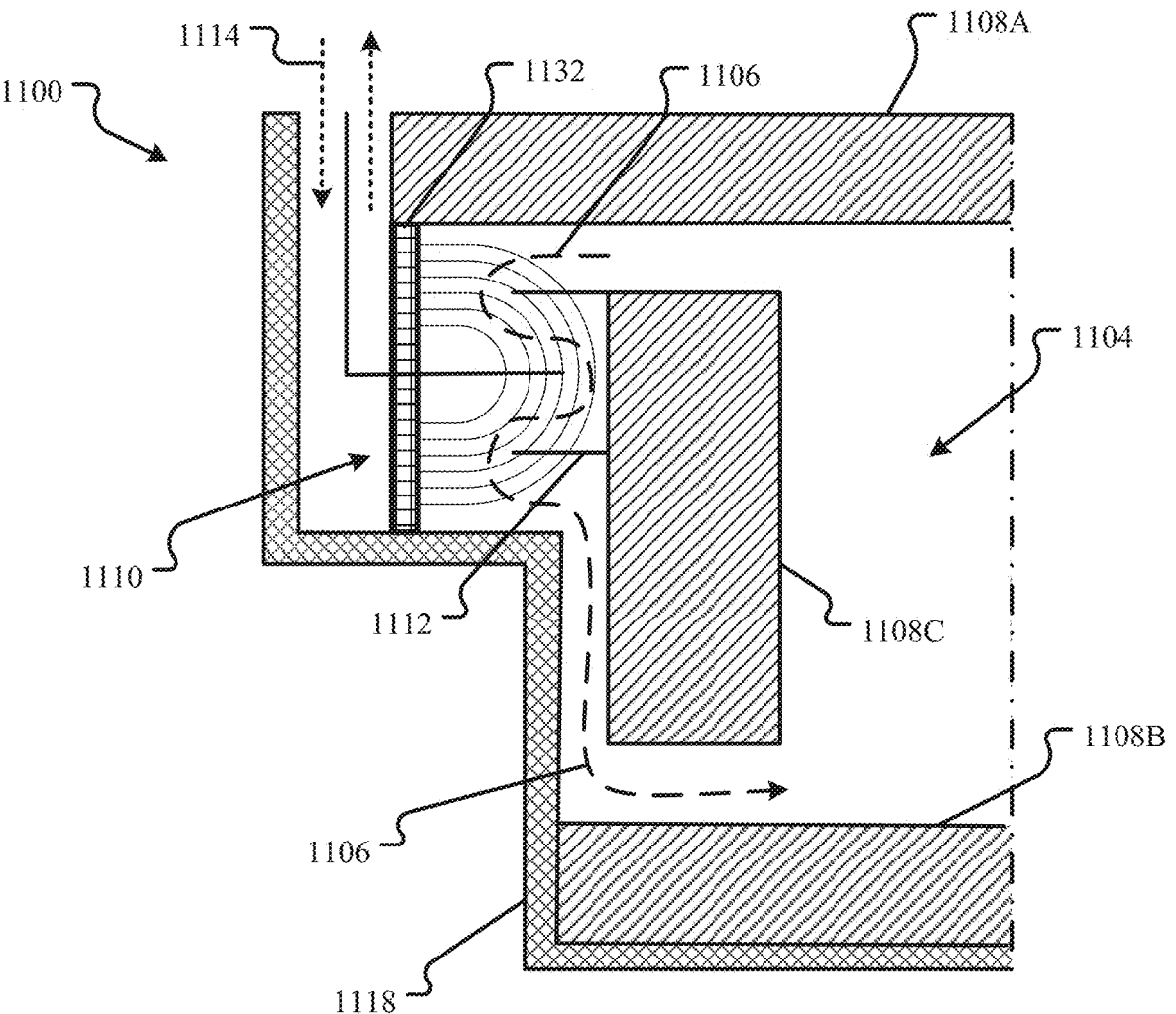
FIG. 11 illustrates an embodiment of a reactor with a shell-side fuel, U-tube heat exchanger configuration in which the single tube sheet is within the reactor but laterally mounted in a location away from the reactor core.

FIG. 11 illustrates an embodiment of a reactor with a shell-side fuel, U-tube heat exchanger configuration in which the single tube sheet is within the reactor but laterally mounted in a location away from the reactor core. In the embodiment, half of the reactor 1100 is illustrated as in FIGS. 4A-6. The reactor core 1104 is surrounded by an upper reflector 1108A, a lower reflector 1108B and an inner reflector 1108C that separates the reactor core from the primary heat exchanger 1110. The spaces between the reflectors 1108A, 1108B, 1108C create channels allowing the circulation of fuel salt (illustrated by a dashed line 1106) from the reactor core 1104 over the inner reflector 1108C, through the shell side of the primary heat exchanger 1110, under the inner reflector 1108C, and back into the bottom of the reactor core 1104. Baffles 1112 are provided in the shell to force the fuel salt to follow a circuitous path around the tubes of the heat exchanger. Coolant flows through the U-shaped tubes of the heat exchanger 1110, so that the coolant both enters the tubes and exits the tubes from the top of the reactor 1000. In the embodiment shown, coolant enters the reactor in a channel next to the containment vessel 1118 and flows downward and then laterally through the lower portion of the tube sheet 1132 and into the heat exchanger 1110. The coolant then exits from the upper portion of the tube sheet 1132 and out of the top of the containment vessel 1118. The flow of the coolant is illustrated by a dashed line 1114. Because the tube sheet 1132 is farther from the reactor core, relative to the designs discussed above, exposure to radiation is reduced. Note that this design is also another embodiment of an actively cooled containment vessel as described above.

In yet another embodiment, the U-tubes may be horizontally-oriented (not shown) as opposed to the vertically-oriented U-tubes illustrated in FIG. 11. This orientation may provide benefits in terms of heat transfer while still locating the tube sheets away from the high flux environment.

In an embodiment, the tube sheet 1132 is further protected from neutron damage by providing a second inner neutron reflector (not shown) between the tube sheet and the fuel salt. In this embodiment, the tubes penetrate the second inner neutron reflector before coming into contact with the fuel salt. This serves to further distance the tube sheet from neutrons emitted by the fuel salt. In an alternative embodiment, the tube sheet 1132 is separated from the fuel salt by a neutron moderator made of some amount of material having a relatively large neutron absorption cross-section such as steel alloys or other materials that include Ag, In, Cd, Bo, Co, Hf, Sm, Eu, Gd, Tb, Dy, Ho, Er, Tm, Yb, Lu. For example, high boron steel, Ag—In—Cd alloys, boron carbide, Titanium diboride, Hafnium diboride, gadolinium nitrate, or any other material used as a control rod or neutron absorber, now known or later developed may be used. In an embodiment, the reflector or absorber may simply be a coating of the appropriate material on the salt contacting side of the tube sheet 1132.

Radial Loop Reactor

Figures 12A, 12B:
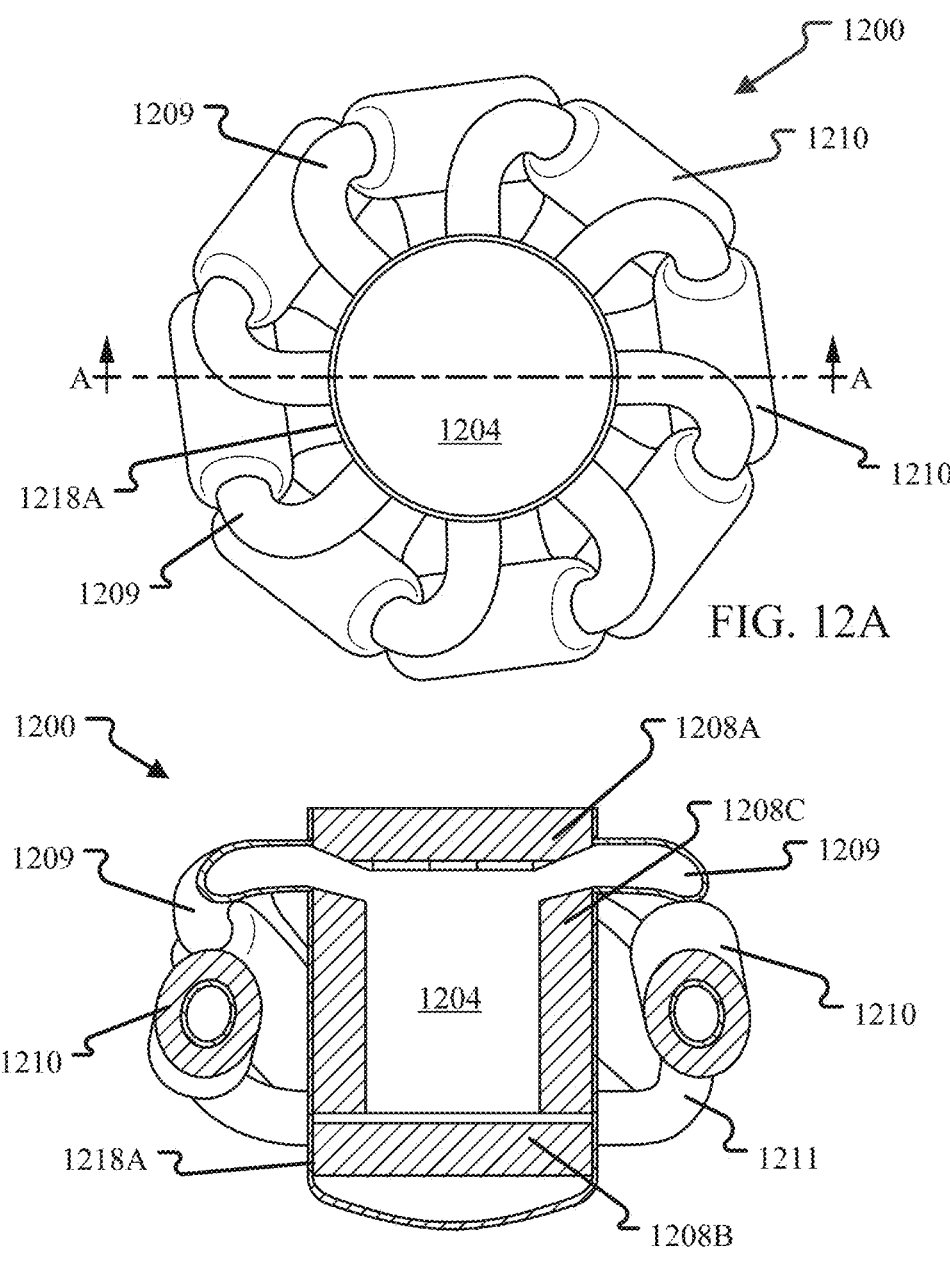
FIGS. 12A and 12B illustrate an alternative reactor design referred to as a radial loop reactor.

FIGS. 12A and 12B illustrate an alternative reactor design referred to as a radial loop reactor. FIG. 12A is a plan view of the reactor 1200 and FIG. 12B is a cross section along the line A-A indicated on FIG. 12A. In the embodiment of the radial loop reactor 1200 illustrated, a reactor core 1204 is defined by an upper reflector 1208A, a lower reflector 1208B and a lateral or inner reflector 1208C in the shape of a tube. The reflectors 1208 are within a core containment vessel 1218A that is penetrated by eight heated fuel salt outlet pipes 1209 located at the top of the containment vessel 1218A and eight cooled fuel salt return pipes 1211 that penetrate the containment vessel at a level of the bottom of the reactor core 1204. Each set of outlet pipe 1209, heat exchanger 1210 and return pipe 1211 may be referred to as a heat exchanger leg.

Eight primary heat exchangers 1210 are shown in a diagonal configuration around the core containment vessel 1218A, although more or fewer primary heat exchangers 1210 may be used depending on the embodiment. It should also be noted that the heat exchanger legs may be vertical or may be more or less diagonal than shown.

In the embodiment shown, heated fuel salt circulates from the reactor core 1204 through the outlet pipes 1209 and through the heat exchangers 1210. The heat exchangers cool the fuel salt which then returns to the bottom of the reactor core 1204 via the return pipes 1211.

In the embodiment shown the reactor core 2204 is cylindrical in shape but this shape could be modified into a substantially frustoconically-shaped reactor core or substantially frustum-shaped reactor core as described above to improve natural circulation of the fuel salt during operation. The word "substantially" is used here to convey that the reactor core shape may not be a perfect frustum having perfectly flat surfaces for the bottom and top and perfectly flat or conical sides. For example, FIGS. 3 and 4 illustrate substantially frustum-shaped reactor cores even though flow directing bulges or other shapes are provided in the center of the top and bottom and on the sides of the reactor core.

In an embodiment (not shown), one or more pumps (or at least the impeller components of such pumps) are provided in one or both of the return and outlet pipes 1211, 1209. In yet another embodiment (not shown), shutoff valves may also be provided in one or both of the return and outlet pipes 1211, 1209, as well as drain taps to allow any one of the eight heat exchanger legs to be independently shut off from the reactor core 1204 and drained of fuel salt for ease of maintenance. In an embodiment (not shown) one or more drain tanks may be provided below the level of the heat exchangers, the core containment vessel 1218A, or the heat exchanger legs for receiving drained fuel salt. In an alternative embodiment, each heat exchanger leg may include a pump in the inlet pipe that evacuates the heat exchanger of fuel salt when it is drained; returning the fuel salt to the reactor core 1204 instead of to a drain tank. One benefit of this layout is that the loop legs and the angles of the heat exchangers can be adjusted to provide additional flexibility for fuel pump location (pumps not shown) to be located at the bottom of the heat exchanger. Furthermore, pump shafts through/beside the heat exchangers or vessel penetrations from below are not required in this embodiment.

As shown in FIG. 12D, a secondary containment vessel 1218B may be provided around the entire reactor core assembly, that is, around all the components in the fuel loop of the reactor 1200. In an embodiment, the secondary containment vessel has a volume sufficient to hold at least all of the fuel salt contained in the reactor. The size may be further increased to provide a safety margin and sized sufficiently large to hold both a volume of coolant and the entire volume of fuel salt in the reactor. The containment vessel may completely surround the radial loop reactor 1200 as shown, may partially surround the reactor, or may simply be a large vessel below the reactor 1200 of sufficient size. In the embodiment, primary coolant is circulated through the primary heat exchangers 1210 from above the secondary containment vessel 1218B.

Radial loop reactors 1200 allow for the size of the primary heat exchangers 1210 to not be limited by the height of the reactor core 1204. Furthermore, as the heat exchangers are outside of the core containment vessel 1218A, they may be more easily serviced and controlled, as well as being farther away from the reactor core and therefore receiving a reduced dose of radiation.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure.

Numerous other changes may be made which will readily suggest themselves to those skilled in the art and which are encompassed in the spirit of the disclosure.

What is claimed is:

1. A molten salt nuclear reactor comprising:
a substantially frustum-shaped reactor core containing a fissionable fuel salt and having a reactor core bottom and a reactor core top, the reactor core bottom being larger than the reactor core top, the reactor core having a heated fuel salt outlet, a cooled fuel salt inlet, and a thermal center above the cooled fuel salt inlet;
at least one heat exchanger that receives heated fuel salt at a heat exchanger fuel salt inlet below the reactor core's heated fuel salt outlet, transfers heat from the fuel salt to a coolant, and discharges the cooled fuel salt at a heat exchanger fuel salt outlet fluidly connected to the reactor core's cooled fuel salt inlet; and
wherein the thermal center of the reactor core is at a level below the heat exchanger fuel salt outlet; and
wherein the location of the thermal center causes natural circulation in the case of a loss of forced flow while the reactor is in a state of criticality.

2. The molten salt nuclear reactor of claim 1 wherein the shape of the reactor core is selected from a frustum of a cone, a frustum of a pyramid, a trapezoidal prism or a hyperboloid.

3. The molten salt nuclear reactor of claim 1, further comprising:

a containment vessel containing the reactor core and the at least one heat exchanger.

4. The molten salt nuclear reactor of claim 1, wherein the location of the thermal center causes natural circulation in the case of a loss of forced flow while the reactor is in a state of subcriticality.

5. The molten salt nuclear reactor of claim 1, further comprising:

an upper neutron reflector defining the top of the reactor core;

a lower neutron reflector defining the bottom of the reactor core; and at least one inner neutron reflector defining sides of the reactor core, the at least one inner neutron reflector being between the at least one heat exchanger and the reactor core.

6. The molten salt nuclear reactor of claim 5, wherein the reactor core's heated fuel salt outlet is a duct between the upper neutron reflector and at least one inner neutron reflector.

7. The molten salt nuclear reactor of claim 5, wherein the reactor core's cooled fuel salt inlet is a duct between the lower neutron reflector and at least one inner neutron reflector.

8. The molten salt nuclear reactor of claim 1, wherein the at least one heat exchanger is a shell and tube heat exchanger in which the fuel salt flows through the tubes of the shell and tube heat exchanger.

9. The molten salt nuclear reactor of claim 1, wherein incoming cold coolant cools a first portion of a containment vessel containing the reactor core and the at least one heat exchanger before the coolant flows into the at least one heat exchanger.

* * * * *